US012597208B2

(12) United States Patent
Zhang et al.

(10) Patent No.: US 12,597,208 B2
(45) Date of Patent: Apr. 7, 2026

(54) BUILDING INFORMATION MODELING SYSTEMS AND METHODS

(71) Applicant: Purdue Research Foundation, West Lafayette, IN (US)

(72) Inventors: Jiansong Zhang, Lafayette, IN (US); Temitope Akanbi, Windsor (CA)

(73) Assignee: Purdue Research Foundation, West Lafayette, IN (US)

( * ) Notice: Subject to any disclaimer, the term of this patent is extended or adjusted under 35 U.S.C. 154(b) by 976 days.

(21) Appl. No.: 17/832,771

(22) Filed: Jun. 6, 2022

(65) Prior Publication Data

US 2022/0391553 A1 Dec. 8, 2022

Related U.S. Application Data

(60) Provisional application No. 63/197,496, filed on Jun. 6, 2021.

(51) Int. Cl.
*G06T 17/20* (2006.01)
*G06T 19/20* (2011.01)

(52) U.S. Cl.
CPC ............ *G06T 17/205* (2013.01); *G06T 19/20* (2013.01); *G06T 2219/2004* (2013.01)

(58) Field of Classification Search
CPC .................. G06T 17/205; G06T 19/20; G06T 2219/2004; G06T 17/10; G06F 30/12; G06F 30/13; G06V 30/422
See application file for complete search history.

(56) References Cited

U.S. PATENT DOCUMENTS 7,555,157 B2 * 6/2009 Davidson .................. G06T 3/40
382/154
8,269,775 B2 * 9/2012 Bourd ................... G06T 11/203
345/442

(Continued)

FOREIGN PATENT DOCUMENTS

CN 113420317 A * 9/2021 ............. G06F 21/10
KR 102209149 B1 * 2/2021 ............. G06N 20/00

OTHER PUBLICATIONS

Vasin et al. The Automated Technology for Converting Drawing and Design Paper-Based Documentation into Electronic 3D Model of an Object [Online]. Nov. 12, 2020 [Retrieved on Aug. 18, 2025]. Retrieved from the Internet: <URL: https://ieeexplore.ieee.org/document/9253284?source=IQplus > (Year: 2020).*

(Continued)

*Primary Examiner* — King Y Poon
*Assistant Examiner* — Michelle Hau Ma
(74) *Attorney, Agent, or Firm* — Purdue Research Foundation

(57) ABSTRACT

A method of generating a three-dimensional (3D) structure model from a two-dimensional (2D) drawing file, which includes one or more illustrations of a structure, using a data processing device includes importing the 2D drawing file to the data processing device, converting the 2D drawing file into a raster graphics file, converting the raster graphics file into a vector graphics file, extracting one or more graphical projections representative of the structure from the vector graphics file, converting the one or more projections into a tagged data graphics file, forming a 3D structure model representative of the structure by connecting the plurality of cartesian points of the tagged data graphics file, and generating an electronic output file including the 3D structure model.

19 Claims, 24 Drawing Sheets

300

(56)                References Cited

U.S. PATENT DOCUMENTS

| | | | | |
|---|---|---|---|---|
| 9,870,647 | B2 * | 1/2018 | Park | B29C 64/386 |
| 11,768,974 | B2 * | 9/2023 | Gallo | G06N 20/00 |
| | | | | 703/1 |
| 2004/0151377 | A1 * | 8/2004 | Boose | G06V 30/422 |
| | | | | 703/23 |
| 2018/0322694 | A1 * | 11/2018 | Byers | G06T 17/05 |
| 2019/0355154 | A1 * | 11/2019 | Batra | G06T 9/00 |

OTHER PUBLICATIONS

Screen captures from YouTube video clip entitled "Export IFC files from Revit," uploaded on Apr. 19, 2021 by user "GAMMA AR". Retrieved from the Internet: <URL: https://www.youtube.com/watch?v=aRBCxOTY1Gk > (Year: 2021).*

The Port Authority of NY & NJ. E/A Design Division BIM Standard [Online]. Oct. 1, 2019 [Retrieved on Aug. 18, 2025]. Retrieved from the Internet: <URL: https://www.panynj.gov/content/dam/port-authority/pdfs/-available-engineering-documents/EAD-BIM-Standard-Manual.pdf > (Year: 2019).*

Anonymous. 'Sheet List Table'. In AutoCAD Forum [online]. Jan. 26, 2017 [retrieved on Aug. 18, 2025]. Retrieved from the Internet: <URL: https://forums.autodesk.com/t5/autocad-forum/sheet-list-table/td-p/6832917 > (Year: 2017).*

Victoria, Scan2CAD. Technical Dissection of the DXF File Format [Online]. Jan. 26, 2016 [Retrieved on Aug. 18, 2025]. Retrieved from the Internet: <URL: https://www.scan2cad.com/blog/dxf/technical-dissection/ > (Year: 2016).*

Victoria, Scan2CAD. Overview: The DXF File [Online]. Jul. 21, 2020 [Retrieved on Aug. 18, 2025]. Retrieved from the Internet: <URL: https://www.scan2cad.com/blog/dxf/overview/ > (Year: 2020).*

Aspose. . NET APIs to Convert AutoCAD Files [Online]. Dec. 1, 2020 [Date from Wayback Machine; Retrieved on Aug. 10, 2025] . Retrieved from the Internet: <URL: https://products.aspose.com/cad/net/ > (Year: 2020).*

Wikipedia. Architectural drawing [Online]. Jun. 10, 2019 [Date from Wayback Machine; Retrieved on Aug. 19, 2025]. Retrieved from the Internet: <URL: https://en.wikipedia.org/wiki/Architectural_drawing > (Year: 2019).*

Xue et al. Example-Based 3D Object Reconstruction from Line Drawings [Online]. Jul. 26, 2012 [Retrieved on Aug. 19, 2025]. Retrieved from the Internet: <URL: https://ieeexplore.ieee.org/document/6247689?source=IQplus > (Year: 2012).*

Autodesk Support. Transform a 2D drawing into a BIM model [Online]. Mar. 28, 2018 [Retrieved on Aug. 20, 2025]. Retrieved from the Internet: <URL: https://www.autodesk.com/support/technical/article/caas/tsarticles/ts/4KAtvicKU5pV5Eg91ffINN.html > (Year: 2018).*

Ablameyko et al. Reconstruction of 3D Object Models from Vectorised Engineering Drawings [Online]. Mar. 4, 2014 [Retrieved on Nov. 13, 2025]. Retrieved from the Internet: <URL: https://link.springer.com/article/10.1007/s100440200001 > (Year: 2014).*

Alshabab, M., Vysotskly, A.E., Khalil, T., and Petrochenko, M. V. (2017). "BIM-based quantity takeoff" Construction of Unique Buildings and Structures, 55 (2017), 124-134.

Aram, S., Eastman, C., and Sacks, R. (2014). "A knowledge-based framework for quantity takeoff and cost estimation In the AEC Industry using BIM" Proc., 31st International Symposium on Automation and Robotics in Construction and Mining., Sydney, Australia, 436-458.

Bae, A., Lee, D., and Park, B. (2016). "Building information modeling utilization for optimizing milling quantity and hot mix asphalt pavement overlay quality" Canadian Journal of Civil Engineering, 2016, 43(10): 888-896.

Benning, P., Publics, B., and France, G. (2017). "IFC for Infrastructure: New Concepts and Entities for Bridges" International Journal of 3-D Information modeling, 2017, 6(3): 44-56.

Bradley, A., Li, H., Lark, R., and Dunn, S. (2016). "BIM for infrastructure: An overall review and constructor perspective" Automation in Construction, 71 (2016) 139-152.

Brownlee, J. (2019). "A gentle Introduction to generative adversarial networks (GANs)." <https://machinelearningmastery.com/what-are-generative-adversarial-networks-gans/> (Jun. 17, 2019).

Choi, J., Kim, H., and Kim, I. (2015). "Open BIM-based quantity takeoff system for schematic estimation of building frame in early design stage." Journal of Computational Design and Engineering, 2(2015), 16-25; available online Dec. 6, 2014.

Dave, B., Boddy, S., and Koskela, L. (2013). "Challenges and opportunities in implementing lean and BIM on an Infrastructure project" Proc., 21st Annual Conference of the International Group for Lean Construction, Fortaleza, Brazil, 741-750.

Fanning, B., Clevenger, C., Ozbek, M., and Mahmoud, H. (2015). "Implementing BIM on Infrastructure: Comparison of the two bridge construction projects." Practice Periodical on Structural Design and Construction, 9 (2015), 376-384; published online Aug. 18, 2014.

Franco, J., Mahdi, F., and Abaza, H. (2015). "Using Building Information Modeling (BIM) for estimating and scheduling, adopting barriers." Universal Journal of Management, 3(9), (2015), 376-384.

Furferi, R., Governi, L., Palai, M., and Volpe, Y. (2010). "From 2D Orthographic Views to 3D Pseudo-Wireframe: An Automatic Procedure" International Journal of Computer Applications, Aug. 2010, 5(6): 18-24.

Huthwohl, P., Brilakis, I., Borrmann, A., and Sacks, R. (2018). "Integrating RC Bridge Defect Information into BIM Models." J. Comput. Civ. Eng., 2018, 32(3).

Isailovic, D., Stojanovic, V., Trapp, M., Richter, R., and Hajdin, R. (2020). "Bridge damage: Detection, IFC-based semantic enrichment and visualization" Automation in Construction, 112 (2020) 103088.

Cheng, J., Lu, Q., and Deng, Y. (2016). "Analytical review and evaluation of civil information modeling." Automation in Construction, 67(2016), 31-47.

Kim, J-U, Kim, Y-J, Ok, H., and Yang, S-H. (2015). "A study on the status of infrastructure BIM and BIM library development." Proc., International Conference on Computational Science and Computational Intelligence (CSCI), Las Vegas, Nevada, 857-858.

Kumar, B., Cai, H., and Hastak, M. (2017). "An assessment of benefits of using BIM on an infrastructure project" Proc., International Conference on Sustainable Infrastructure 2017, New York, NY, 88-95.

Lau, S., Zakaria, R., Aminudin, E., Saar, C., Yusof, A., and Wahid, C. (2018). "A review of application building Information modeling (BIM) during pre-construction stage: retrospective and future directions." Proc., IOP Conf. Series: Earth and Environmental Science (CSCI), 143 (2018) 012050.

Lu, W., Peng, Y., Shen. Q., and Li, H. (2013). "Generic model for measuring benefits of BIM as a learning tool in construction tasks." Journal of Civil Engineering and Management, Feb. 2013, pp. 195-203; DOI: 10.1061/(ASCE)CO.1943-7862.0000585.

Park, S., Lee, S-H., Almasi, A., and Song, J-H. (2020). "Extended IFC-based strong form meshfree collocation analysis of a bridge structure" Automation in Construction, 119 (2020) 103364.

Robinson, H., Symonds, B., Gilbertson. B., and Ilozor, B. (2015). Design Economics for the Built Environment—Impact of Sustainability on Project Evaluation; 2015 John Wiley & Sons, Ltd., West Sussex, UK, pp. 232-234.

* cited by examiner

100

600

600

| Bridge | Mean Distance | Standard Deviation | Time (Revit, hrs.) | Time (Developed Described Methods, hrs.) |
|---|---|---|---|---|
| C | 0.283575 | 0.152927 | 5.00 | 0.1667 |
| D | 0.312375 | 0.216435 | 5.50 | 0.2167 |
| E | 0.246914 | 0.186235 | 4.80 | 0.1667 |
| F | 0.266784 | 0.221548 | 5.30 | 0.1667 |
| G | 0.291547 | 0.156485 | 4.30 | 0.1875 |
| H | 0.219265 | 0.101251 | 5.10 | 0.1667 |
| AVERAGE | | | 5.00 | 0.1785 |

FIG. 21

| | BRIDGE C | | | | BRIDGE D | | |
|---|---|---|---|---|---|---|---|
| Class | Value | Class Start | Class End | Class | Value | Class Start | Class End |
| 1 | 5626 | 0.000000000000 | 0.855101598613 | 1 | 8 | 0.000000000 | 0.000604521 |
| 2 | 5650 | 0.855101598613 | 1.710203197227 | 2 | 26 | 0.000604521 | 0.000874459 |
| 3 | 5600 | 1.710203197227 | 2.565304795840 | 3 | 69 | 0.000874459 | 0.001144397 |
| 4 | 5629 | 2.565304795840 | 3.420406394453 | 4 | 199 | 0.001144397 | 0.001414335 |
| 5 | 5611 | 3.420406394453 | 4.275507993066 | 5 | 314 | 0.001414335 | 0.001684272 |
| 6 | 5667 | 4.275507993066 | 5.130609591680 | 6 | 527 | 0.001684272 | 0.001954210 |
| 7 | 5643 | 5.130609591680 | 5.985711190293 | 7 | 804 | 0.001954210 | 0.002224148 |
| 8 | 5550 | 5.985711190293 | 6.840812788906 | 8 | 1067 | 0.002224148 | 0.002494086 |
| 9 | 5453 | 6.840812788906 | 7.695914387519 | 9 | 1409 | 0.002494086 | 0.002764023 |
| 10 | 5421 | 7.695914387519 | 8.551015986133 | 10 | 1774 | 0.002764023 | 0.003033961 |
| 11 | 5221 | 8.551015986133 | 9.406117584746 | 11 | 2312 | 0.003033961 | 0.003303899 |
| 12 | 5024 | 9.406117584746 | 10.261219183359 | 12 | 2667 | 0.003303899 | 0.003573837 |
| 13 | 4963 | 10.261219183359 | 11.116320781972 | 13 | 2887 | 0.003573837 | 0.003843774 |
| 14 | 4920 | 11.116320781972 | 11.971422380586 | 14 | 3425 | 0.003843774 | 0.004113712 |
| 15 | 4848 | 11.971422380586 | 12.826523979199 | 15 | 3841 | 0.004113712 | 0.004383650 |
| 16 | 4601 | 12.826523979199 | 13.681625577812 | 16 | 4169 | 0.004383650 | 0.004653588 |
| 17 | 4312 | 13.681625577812 | 14.536727176425 | 17 | 4570 | 0.004653588 | 0.004923525 |
| 18 | 3909 | 14.536727176425 | 15.391828775039 | 18 | 4917 | 0.004923525 | 0.005193463 |
| 19 | 3743 | 15.391828775039 | 16.246930373652 | 19 | 5186 | 0.005193463 | 0.005463401 |
| 20 | 3601 | 16.246930373652 | 17.102031972265 | 20 | 5534 | 0.005463401 | 0.005733339 |

FIG. 24

BUILDING INFORMATION MODELING SYSTEMS AND METHODS

CROSS-REFERENCE TO RELATED APPLICATIONS

This application is related to and claims the priority benefit of U.S. Provisional Patent Application No. 63/197,496, entitled "Framework for Developing IFC-Based 3D Documentation from 2D Bridge Drawings," filed Jun. 6, 2021, the contents of which are hereby incorporated by reference in their entirety into the present disclosure.

GOVERNMENT SUPPORT CLAUSE

This invention was made with government support under OIA1937115 awarded by the National Science Foundation. The government has certain rights in the invention.

TECHNICAL FIELD

The present application relates to building information modeling, and specifically to systems and methods for converting two-dimensional structure models residing in drawings and plans, such as bridge models, to three-dimensional models which meet industry standards.

BACKGROUND

This section introduces aspects that may help facilitate a better understanding of the disclosure. Accordingly, these statements are to be read in this light and are not to be understood as admissions about what is or is not prior art.

Building Information Modeling (BIM) is revolutionizing the way in which architects, engineers, and construction contractors conduct their business. One of the many benefits of BIM is to provide a comprehensive information source for the geometric attributes of the elements in a model. Various civil infrastructure projects have begun implementing BIM to primarily create an integrated three-dimensional (3D) information model in aiding cost savings for all resources during the lifecycle of the infrastructure. Several of the benefits of utilizing BIM on an infrastructure project include enhanced coordination, quick and improved clash detection, enhanced productivity in design management, improved risk management identification, and efficient and accurate material quantities extraction. Similar to building projects, BIM tools have significant potential to add values across the life cycle of infrastructure projects.

In the preconstruction phase, BIM is often used in assessing project constructability, and in developing the project budget and schedule. In the construction phase, BIM is often used to enhance inter-trade coordination and provide quality control while the project is being executed. Through the lifecycle of the project, BIM is often used in developing the maintenance plan. To take full advantages on the benefits that could be obtained from the use of BIM in the design, construction and maintenance of horizontal construction, present BIM development in the civil infrastructure domain is heavily focused on bridges. Although BIM offers these benefits for bridge design, construction, and maintenance; current BIM-based practices for bridges are not fully developed. Traditional two-dimensional (2D) bridge drawings and manual processes are still the de-facto standard. In manual processes, trained professional engineers and practitioners perform periodic inspections to identify areas that require maintenance. Once these maintenance areas are identified, maintenance work items are then generated. Most of the processes in generating and computing the work items and quantities for these identified maintenance areas are usually computed manually or by using systems that still rely heavily on manual inputs and approximate quantities. This is mainly because the existing bridge drawings are mostly in the traditional 2D format. In the industry, processing of traditional 2D drawings, such as quantity takeoff, are typically conducted using on-screen takeoff platforms. These processes, in spite of improvement over using hardcopies, still rely heavily on manual efforts which are time-consuming, cumbersome, and also require years of bridge technical experience.

To fully utilize the benefits of BIM for existing bridges, a 3D information model is required. The current industry practices are to develop these 3D information models from scratch using information manually retrieved from the record drawings. In contrast, this disclosure presents an approach for semi-automatically generating a 3D information model from 2D Portable Document Format (PDF) bridge drawings (or 2D drawings in other formats such as scanned images) in the industry foundation classes (IFC) format. As a result of the interoperability gap in the architecture, engineering, and construction (AEC) industry, a non-proprietary standard for uniform information exchanges is the most promising direction. IFC was chosen as the final output because it is a registered non-proprietary standard for uniform information exchange within the AEC industry. IFC is a comprehensive robust data model that is supporting software vendor-independent BIM data exchange.

In the government sector, the U.S. Department of Transportation Federal Highway Administration (FHWA) has implemented the use of BIM for bridge construction in the United States. Hence, various state Department of Transportations (DOTs) are now faced with heightened pressure to comply with the FHWA's Bridge Information Modeling (BrIM) standardization. Although BIM-based platforms can provide many benefits to DOTs, existing BIM-based platforms for certain structures, such as bridges, are not fully developed to process traditional two-dimensional (2D) bridge drawings for BIM-based computational tasks of existing bridges (e.g., BIM-based cost estimations). Bridges are critical infrastructures to any nation's economy and by law the DOTs are tasked with ensuring that these bridges remain safe for use. Currently, to maintain bridges, trained professional engineers perform periodic inspections by assessing each part of the bridge to identify areas that require maintenance. Maintenance work orders are then generated for these areas. These maintenance work orders are usually computed manually or by using systems that rely heavily on manual user inputs. These manual processes are time-consuming and cumbersome, and also depend heavily on extensive technical expertise of the user.

Accordingly, improvements in generating accurate structure models, which conform to industry standards, from existing 2D drawings are desired.

SUMMARY

The present disclosure includes aspects which can overcome the limitations of existing structure modeling and drawing conversion technologies and improve the accuracy of generating maintenance work orders for structures. Generally, as described in various embodiments herein, methods of modeling bridges can include processing existing 2D bridge drawings for bridges that were built pre-BIM adoption in the AEC industry, converting these record drawings to three-dimensional (3D) information models, and converting the 3D information models to industry foundation classes (IFC) files.

More particularly, aspects of the present disclosure can include one or more method steps in various combinations. For example, the method can include importing a 2D drawing file to the data processing device, and the 2D drawing file can include one or more illustrations of a structure. The method can further include converting the 2D drawing file into a raster graphics file, converting the raster graphics file into a vector graphics file, extracting one or more graphical projections representative of the structure from the vector graphics file, and converting the one or more projections into a tagged data graphics file. The tagged data graphics file can include a plurality of cartesian points. Still further, the method can include forming a 3D structure model representative of the structure by connecting the plurality of cartesian points, and generating an electronic output file including the 3D structure model. In some aspects, the method can include converting the 3D structure model into an industry foundation classes (IFC) standard file.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

FIG. 21 depicts a data table representative of a summary of experimental results from performance of the method of FIG. 10;

FIG. 24 depicts a data table representative of experimental results from performance of the method of FIG. 10.

Figure 1:
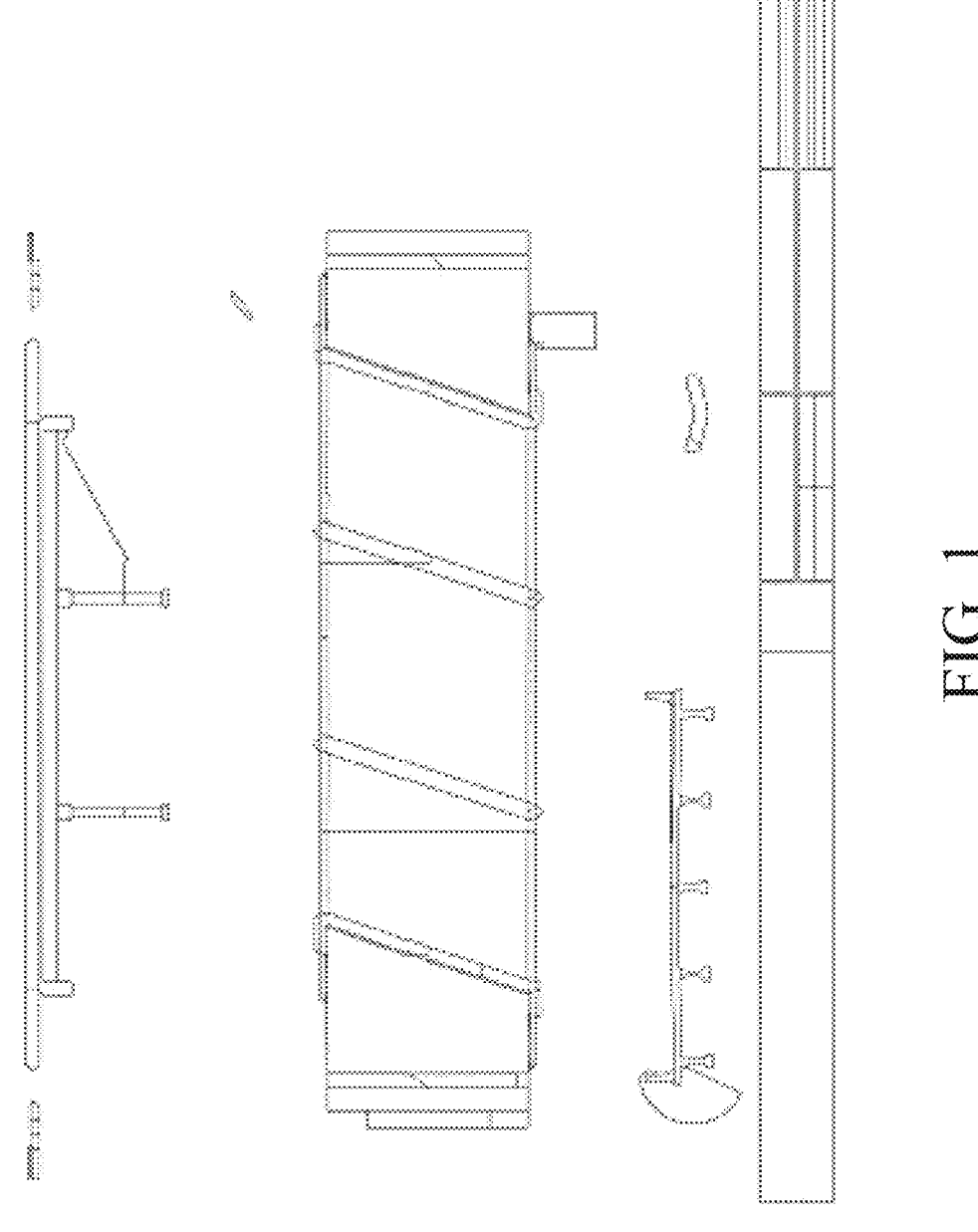
FIG. 1 depicts a collection of vector orthographic views of a bridge structure.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown, or the precise experimental arrangements used to arrive at the various graphical results shown in the drawings.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Overview

The present disclosure describes systems and methods for converting two-dimensional structure models, such as bridge models, to three-dimensional models which meet industry standards. As will be described in greater detail below, the systems and methods provided herein are tailored to overcome the limitations of existing structure modeling and drawing conversion technologies and to provide 3D models of structures more efficiently and less labor-intensively which have many practical applications and benefits such as improving the accuracy of generating maintenance work orders for structures. The developed 3D models using the disclosed technology were compared against developed 3D models using the traditional manual method. Experimental results for the 3D model generation have shown that the disclosed technology can be utilized in developing algorithms that can generate 3D models and IFC output files from PDF (or other 2D formats such as scanned images) bridge drawings in a semi-automated fashion. In the experiments, the developed algorithms utilized 3.33% of the time it took using the current state of the art method to generate a 3D model and the generated models were of comparative quality and accuracy. It should be noted that, while 2D bridge models are predominantly described herein, any 2D structure may be modeled using the systems and methods described.

A. 3D Shape Generation

Figure 2:
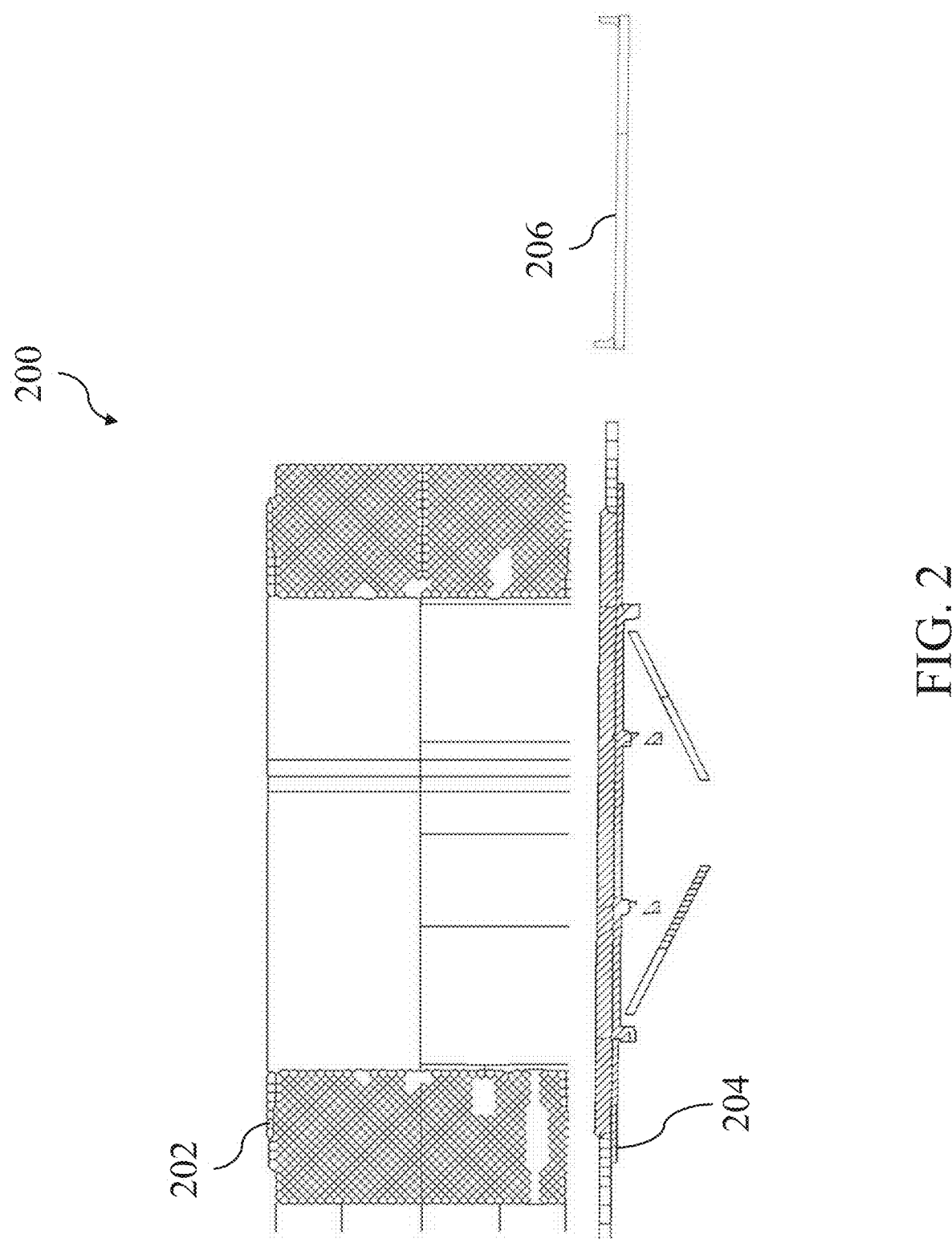
FIG. 2 depicts a collection of projection orthographic views of the bridge structure of FIG. 1.

Proposed systems and methods for geometric shape representation of objects use "generative modeling." Generative modeling is a process that involves automatically discovering and learning the regularities or patterns in an input data in such a way that the model can be used to generate outputs that plausibly could have been drawn from the original data set. An object representation typically must satisfy two benchmarks; first, generative 3D whereby a user should be able to generate a 3D representation from the object representation, and second, 2D predictability whereby a user should be able to construe the object representation from images. As described in greater detail below, a three-dimensional representation of a bridge is constructed using a collection of vector graphics orthographic views (100) of the bridge, as generally shown in FIG. 1. Particularly, an object such as a bridge structure can be represented by a series of univocal set of projections (200), as generally shown in FIG. 2. For example, it can be represented as top projection (202), front projection (204), and side projection (206). A representation of a 3D wireframe model can then be generated utilizing these projections to form an object, in this case a bridge structure. There are typically four processes involved in generating such models from 2D images: (1) labelling of vertices; (2) topological representation of edges; (3) creation of intermediate vertices and collinear edges; and (4) creation of vertices and edges in 3D space.

B. Building Information Modeling (BIM) for Infrastructure Projects

BIM is often utilized for infrastructure projects, especially bridges, and there are significant differences in the modeling of infrastructures when compared to the modeling of buildings. Three main differences between infrastructure 3D models and building 3D models include: (1) the structure and components of infrastructures are distinct from the structures and components of buildings, as an example, buildings have openings such as windows and doors which are not present in infrastructures; (2) the vocabulary in infrastructures is different from the vocabulary of buildings, as an example, piers in bridges are referred to as columns in buildings; (3) the modeling procedures and techniques in infrastructures differ significantly from the modeling techniques in buildings. These differences should be taken into consideration while generating the 3D information model and IFC output files for infrastructures.

C. Industry Foundation Classes (IFC) for Infrastructure Projects

There has been considerable amount of effort with regard to the extension of IFC to the infrastructure domain. The IFC-bridge schema has been extended to enhance interchanging parametric bridge models in an effort to reduce the effort required for implementing changes during the design stage of bridges. Methodologies have been created to enhance the IFC model for bridges by identifying missing concepts and classes in an existing IFC bridge model. One development is an IFC-based system to categorize inspection information on Reinforced-Concrete (RC) bridges. Another system addresses the lack of standardization that hinders the re-use of inspection information amongst professionals and practitioners. IFC-based approaches are also developed for integrating point cloud-based detection of bridge component damages through a semantic enhancement of the as-built models. Other approaches utilize an IFC-based method that reduces the manual processes involved in meshing of finite elements of BIM bridge models.

Accordingly, improvements are needed to address the research gap in the development of 3D information models of existing bridge structures. Described below are various aspects of a framework which may be utilized for the semi-automated generation of 3D information models and IFC files from 2D orthographic bridge drawings. The ISO IFC standard is used to support the conversion of the 3D information model generated from the traditional 2D drawings.

Figure 3:
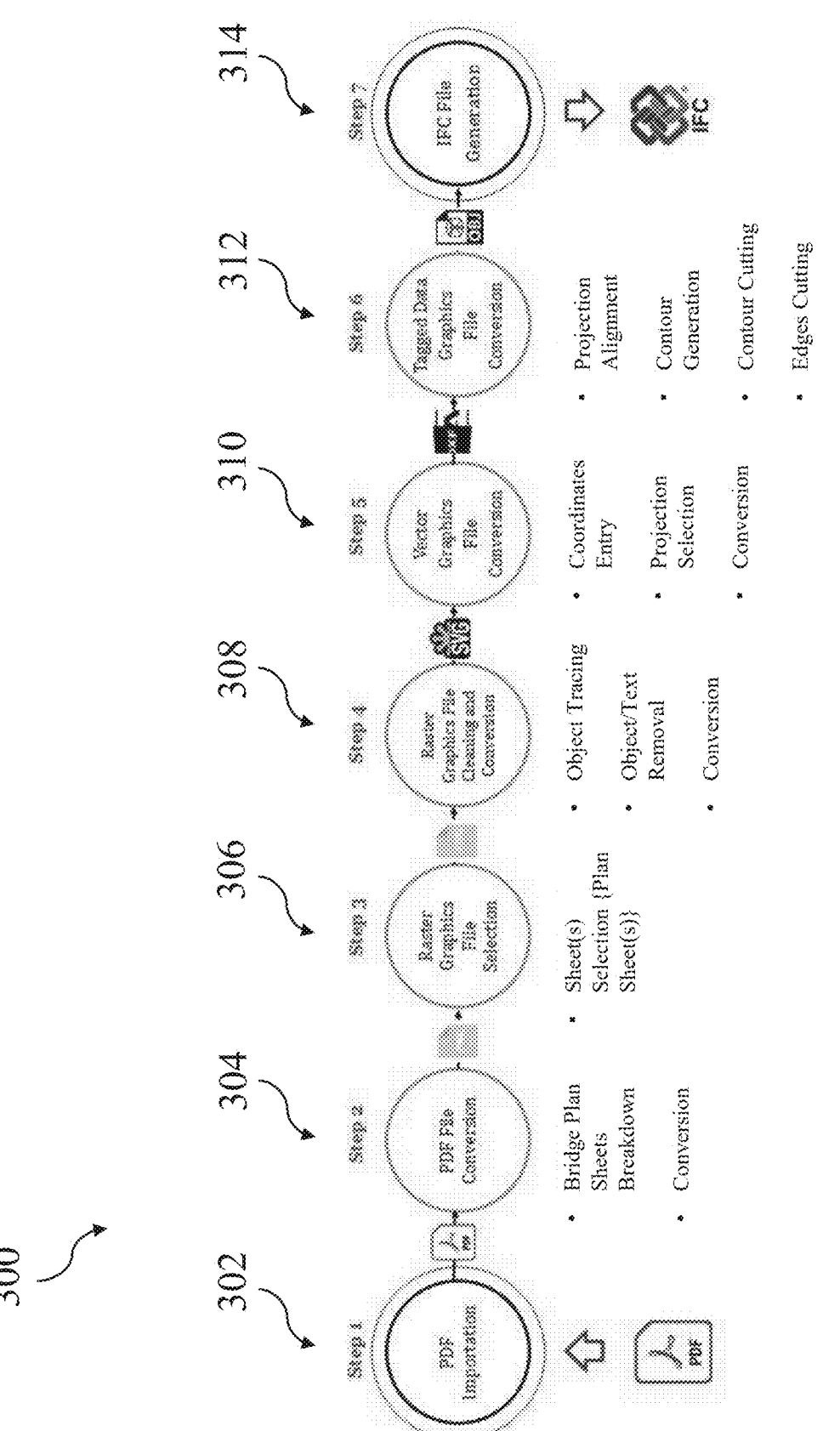
FIG. 3 depicts a flowchart of one exemplary method of semi-automated generation of 3D models from 2D drawings.

II. Systems and Methods for Semi-Automated Generation of 3D Models from 2D Drawings FIG. 3 illustrates a flowchart of one exemplary method (300) that can be used to develop algorithms that can, among other things, process existing 2D bridge drawings, convert these record drawings to 3D information models, and further convert the 3D information models to IFC files. The methods and algorithms may be implemented on a computer system having a data processor, input devices, and output devices specifically configured and operable to accept and manipulate various files sizes and types as will be described within the method steps. In some embodiments, a non-transitory machine-readable storage medium is utilized to store a machine-readable program representative of the method therein.

Generally, at step 1 (302), a source file (e.g., a PDF or scanned image) of bridge drawings is input into the computer, such as via the data processor. At step 2 (304), the imported 2D PDF file (or other 2D formats) is converted into a raster graphics format. At step 3 (306), the required sheet(s) are selected from the generated raster graphics file. At step 4 (308), unnecessary texts are removed from the selected sheet(s) from Step 3 (306) and a vector graphics file is generated. At step 5 (310), the required main projections are extracted from the vector graphics file and the vector graphics file is converted into a tagged data graphics file. At step 6 (312), the cartesian points in the tagged data file are connected and the 3D image object is generated from the connected cartesian points. At step 7 (304), the ISO IFC standard is utilized to support the conversion of the 3D information model generated from the traditional 2D drawings to IFC output files. While each step is generally introduced above, details of the method steps are described in greater detail below.

A. Step 1: PDF Import

Typically, the 2D bridge drawings are in a batch of PDF files. In this step (302), the bridge plans (e.g., a batch of PDF files) are imported into the proposed system utilizing the data processor and any internal or external data storage mediums, or data connections, as necessary.

B. Step 2: PDF File Conversion

In this step 2 (304), the imported bridge plans from Step 1 (302) are converted to a raster graphics file format. A raster image may be dot matrix structure composed of several fixed rectangular grid of pixels that make up a complete image. There are multiple raster format file types (e.g., Joint Photographic Experts Group (JPEG), Graphics Interchange Format (GIF), Portable Network Graphics (PNG), etc.) which may be utilized. The PDF bridge plans may contain different information, such as the projections of the bridge, cross-sections of the bridge, elevations of the bridge and other information. In the further processing for the generation of the 3D model, the PDF files may be converted to a raster graphics format. One method of converting the imported 2D bridge plans into a raster graphics file format includes utilizing a graphics library to read and interpret the 2D drawing file.

C. Step 3: Raster Graphics Sheets Selection

Once the PDF file(s) have been processed and the associated raster graphics files are generated, the sheet(s) containing the required projections may be selected from the batch of raster sheets created. The bridge PDF file may contain several sheets such as the title sheet, index sheet, cross-section sheet, profile sheet, plan sheet(s), etc. The required projections are often contained in the plan sheet(s). The plan sheet(s) would typically contain the plan view of the bridge, the elevation view of the bridge, and the typical cross-section view of the bridge. However, the naming convention of the sheet(s) may vary slightly depending on the user(s) of the bridge plans such as the various owners, contractors, and consultants.

D. Step 4: Raster Graphics File Conversion

Figure 4:
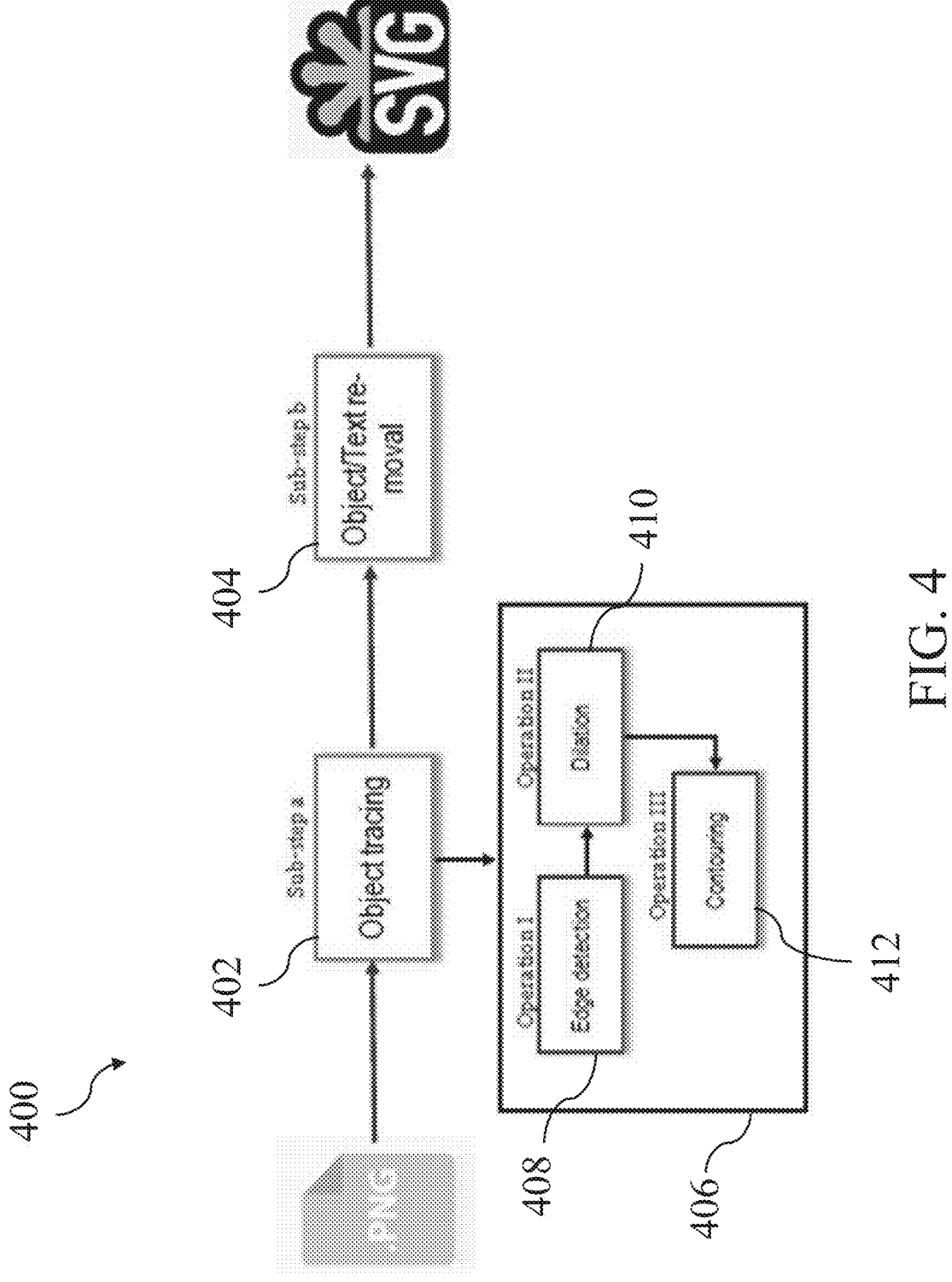
FIG. 4 depicts a flowchart of Step 4 of the method of FIG. 3, showing additional steps for converting a raster graphics file to a vector graphics file.

The selected raster graphics' sheet(s) from Step 3 (306), such as the general plan sheet(s), contain the required projections for the generation of the 3D model and other irrelevant information to the 3D information model generation process. Examples of irrelevant information include letterings, plan titles, dimensions, etc. To expunge the irrelevant information, the raster graphics file is converted to a vector graphics file. Vector graphics images allow for more flexibility (e.g., scaling of shapes and changing colors) over raster graphics images and are defined in terms of points on a cartesian plane. The process of converting raster graphics files to vector graphics files involves two general sub-steps. Shown in FIG. 4 is a method (400) including a first sub-step (402) and a second sub-step (404) which together form a portion of step 4 (308) (see, FIG. 3) described above. Particularly, the first sub-step (402) includes object tracing, while the second sub-step (404) includes object and/or text removal.

i. Object Tracing

As shown in FIG. 4, a series (406) of three operations may be included in the first sub-step 402, which collectively performs object tracing functions. The first operation (408) includes edge detection (408), the second operation (410) includes dilation, and the third operation (412) includes contouring. More specifically, edge detection is operable to identify boundaries of an object within an image. Edge detection may be necessary for the image segmentation and the extraction of required data from the selected raster graphics sheet(s). Once the object edges within the image are detected, the image is further processed by dilation, which is a morphological operation. Dilation may be used to emphasize the features of the objects and to join together detached parts of the objects within the image. Finally, contouring is operable to append continuous lines along the object boundaries.

ii. Object/Text Removal

Also as shown in FIG. 4, the second sub-step (404) is operable to remove from the file any shapes with values that do not meet a pre-defined threshold. The pre-defined threshold may be defined as the minimum pixel value an object must attain to be included by our object tracing algorithm. A pre-defined value may be user-selected or automatically generated by the data processor based on the object to be processed. Any object with an intensity value lower than the threshold could be discarded and removed.

One exemplary method of converting the 2D drawing file into the vector graphics file includes generating an red-green-blue-alpha (RGBA) color model by utilizing one or more existing libraries (e.g., GhostScript® interpreter software), performing characteristics identification of the features by applying one or more filters, performing masking of irrelevant features by creating a grayscale mask, performing object tracing of the structure, performing object removal to remove from the 2D drawing file any objects or shapes with values that do not meet a pre-defined threshold, and performing text removal to remove from the 2D drawing file any text with values that do not meet or exceed a pre-defined threshold. In some methods, the pre-defined threshold may be selected as a minimum pixel value of an object, shape, or text.

E. Step 5: Vector Graphics File Conversion

At step 5 (310) (see, FIG. 3), the vector graphics files generated from step 4 (308) (see, FIG. 3) are converted into tagged data graphics files. Tagged data graphics is a format used by computer aided design (CAD) needed to produce 3D drawings. A tagged data graphics file may be required to mathematically describe the object to be modelled. One tagged data graphics file is created for each projection. The process of converting vector graphics format to tagged data graphics format may consist of two operations: coordinate entry and projection selection. The coordinate entry operation is configured to input the coordinate entries of the selected projections. The projection selection operation is configured to select and separate each projection. Similar to some steps in the system, the inputting of coordinate entries may be conducted manually, although this task may in some cases be conducted automatically using the data processor and an algorithm, such as one utilizing machine learning.

F. Step 6: Tagged Data File Conversion

Figure 5:
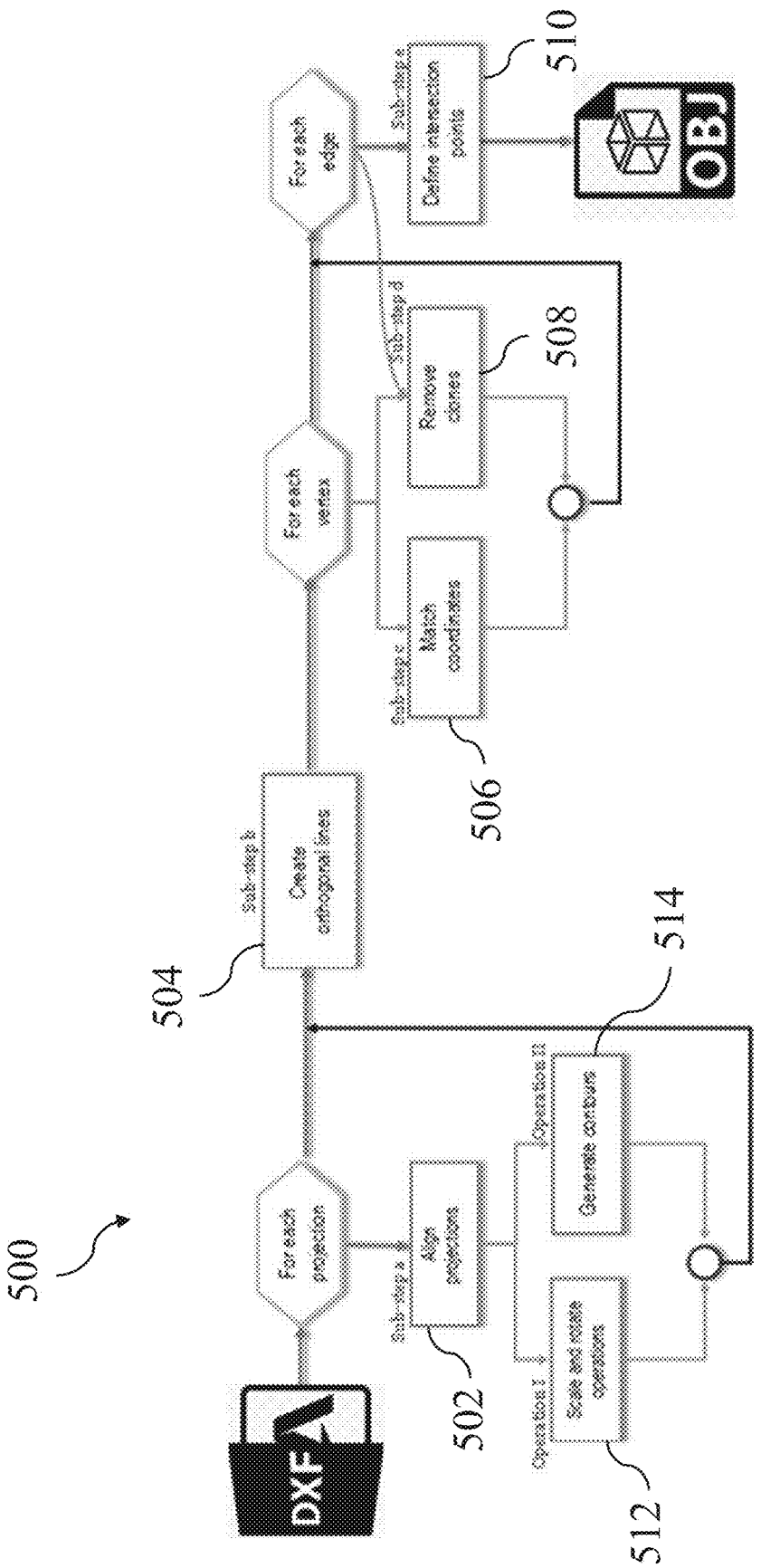
FIG. 5 depicts a flowchart of Step 6 of the method of FIG. 3, showing additional steps for converting a tagged data graphics file format to an OBJ file format.

Step 6 (312) (see, FIG. 3) is configured to carry out the processing and generation of the 3D image projection. In this step 6 (312) (see, FIG. 3), the lines between the cartesian points are created and utilized to generate the 3D images. The 3D model is displayed in fragments for batch processing to reduce the computing load and increase the speed of the 3D image processing. As shown in FIG. 5, a series (500) including five general sub-steps are used for processing the 3D models. Specifically, at the first sub-step (502), for each projection, the projections are aligned. At the second sub-step (504), orthogonal lines are created. At the third sub-step (506), for each vertex, the coordinates are matched. At the fourth sub-step (508), still at each vertex, the clones are removed. At the fifth sub-step (510), for each edge, the intersection points are defined. Each of the sub-steps (502, 504, 506, 508, 510) will be described in greater detail below.

i. Sub-Step 1: Aligning Projections

Figure 6B:
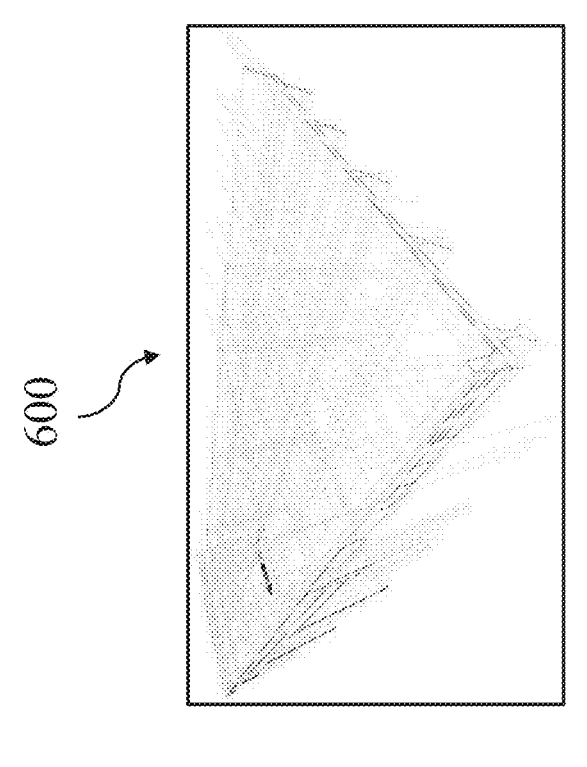
FIG. 6B depicts a projection orthographic view of the example results of FIG. 6A, showing aligned projections of the bridge structure following the first sub-step of Step 6 of the flowchart of FIG. 3.
Figure 6A:
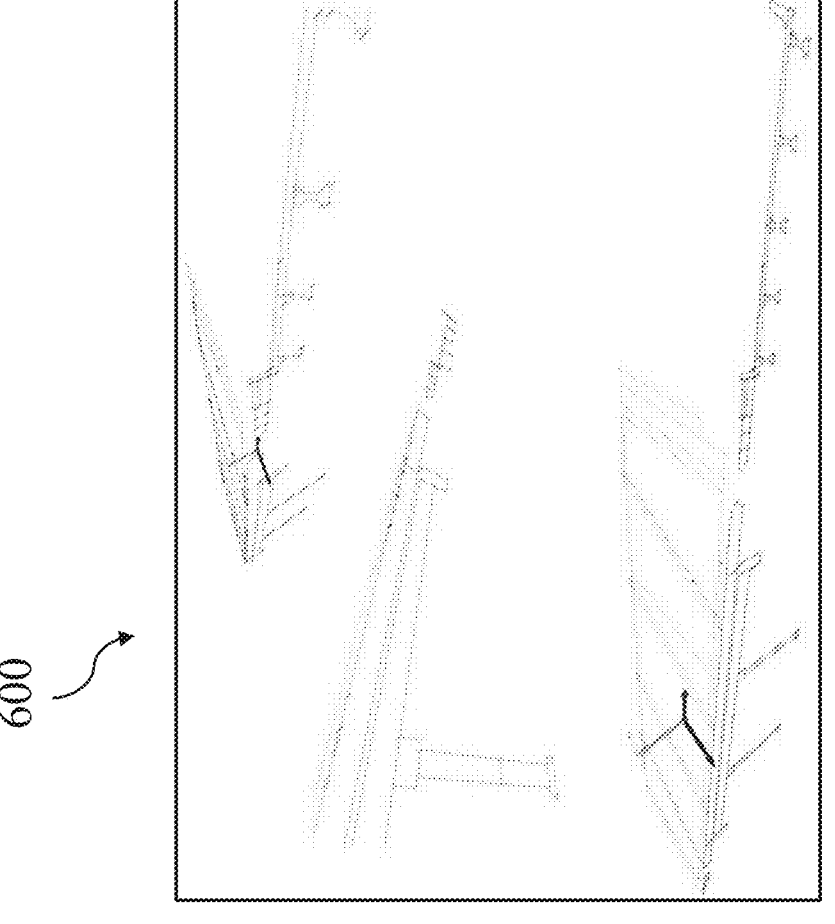
FIG. 6A depicts a collection of projection orthographic views of example results modeling a bridge structure following Step 5 of the method of FIG. 3, showing unaligned projections of the bridge.

The projections from step 5 (310) (see, FIG. 3) are sometimes not aligned due to unmarked hidden edges or edges that are not provided on the orthographic drawings. FIG. 6A shows one example of the unaligned projections for a bridge (600), whereas FIG. 6B shows an aligned projection for the same bridge. In this sub-step 1 (502), two operations (512, 514) are utilized to align the extracted projections. First, at the first operation (512), the virtual faces of each extracted projection are shifted to avoid errors between the extracted projections by scaling and rotating operations. Additionally, at the second operation (514), contours are generated for the projections.

ii. Sub-Step 2: Creating Orthogonal Lines

Figure 7:
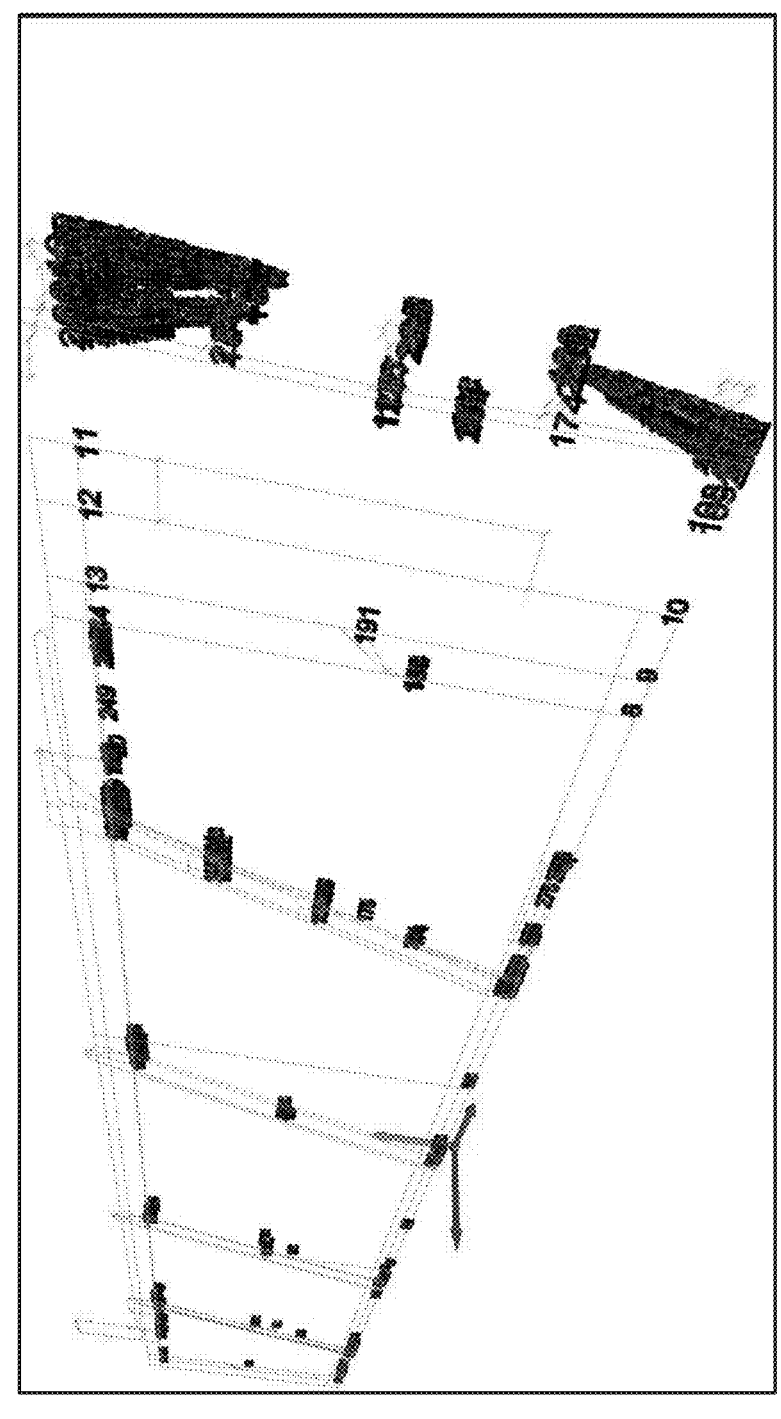
FIG. 7 depicts a projection orthographic view of the example results of FIG. 6A, showing projections of the bridge following the second sub-step of Step 6 of the flowchart of FIG. 3.

In this sub-step 2 (504), the data processor is configured to generate non-float rounded values for coordinates by creating orthogonal lines from the projections from sub-step 1 (502) to their opposite planes. As shown in FIG. 7, orthogonal lines (i.e., indexes) are created based on the vertices and corresponding edges generated in sub-step 1 (502). The generated contours from the second operation (514) of sub-step 1 (502) produce both the needed contours for the 3D image generation and, in some cases, unnecessary contours for the 3D image generation. The unnecessary contours generated are cropped and removed before the execution of sub-step 2 (504).

iii. Sub-Step 3: Matching Coordinates

Figure 8:
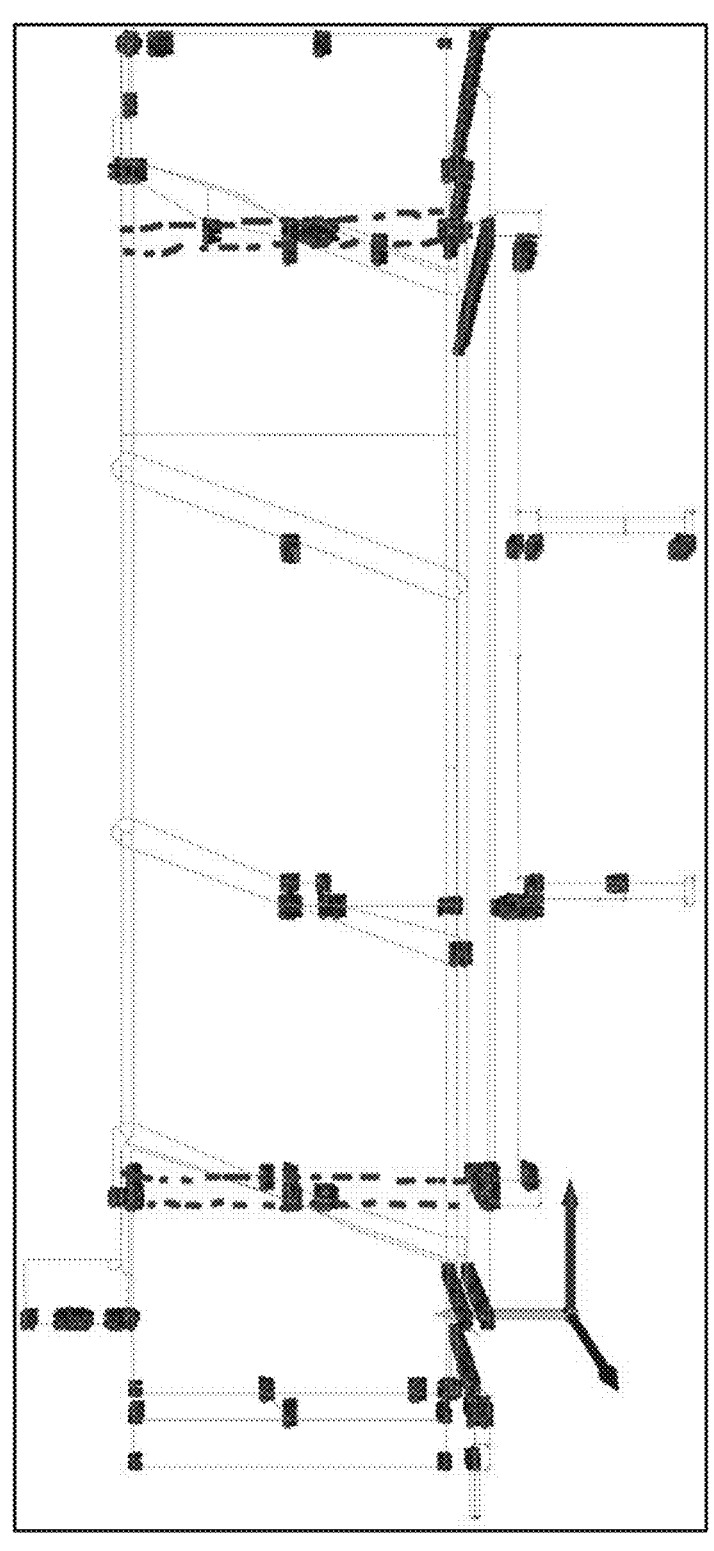
FIG. 8 depicts a projection orthographic view of the example results of FIG. 6A, showing projections of the bridge following the third sub-step of Step 6 of the flowchart of FIG. 3.

At sub-step 3 (506), the arrays are optimized. By optimizing arrays, the coordinates are further matched by mapping the edges and vertices, and a distortion in the structure to be generated is avoided. For vertices' coordinates to be matched, the distance between the vertices must be within an acceptable tolerance to indicate that the vertices are the same point and therefore can be matched. FIG. 8 shows an example of matching coordinates. The black dots shown in FIG. 8 represent the unique IDs of the vertices and edges; while the dashed lines represent the unmatched coordinates. The matching of coordinates generates the mapping by comparing the unique IDs with concurrent vertices and edges.

iv. Sub-Step 4: Removing Clones

At sub-step 4 (508), clones are removed for vertices and edges. First, the intersection points of the edges and vertices are determined in the resulting model from sub-step 3 (506) and these new edges or vertices are added to the edge and vertices matrix. Next, object edges and vertices are verified by comparing the corresponding projection to each coordinate plane, model edge, or vertex. Each uncertain object edge or vertex contained in at least two noncoplanar virtual faces that do not belong to the projection can be identified and deleted. The process of deleting impossible virtual faces that do not meet the criterion and updating the virtual faces is an iterative process until a stable condition is achieved (i.e., the vertices and edges have unique matrixes).

v. Sub-Step 5: Defining Intersection Points

At sub-step 5 (510), virtual cutting edges are introduced along the lines of the intersections of the virtual faces. Furthermore, a list of siblings with common parent edges and faces and a list of correlations between the edges and faces which cannot co-exist in an object are generated. These data structures are used in this final stage of the 3D image development algorithms, where small independent virtual faces are removed. Sub-step 5 (510) is operable to be the last operation in processing and generating the 3D image projection.

G. Step 7: IFC File Generation

There may be two outputs from step 6 (312) (see, FIG. 3). A first output is an OBJ file which contains the 3D mesh object. A second output is an encrypted BIN file that contains the project data. The encrypted BIN file may be configured to contain the cartesian points and indexed polygonal face data of the projections that are used to generate the IFC output file. Design data such as the geometric data contained in the BIN file is complex, and errors may arise when exchanging between different platforms. In preventing such errors, the binary data are read and converted to standard codecs first. In this operation, the data from the BIN files are read and the values are appended to their corresponding representation in the IFC file format.

III. Application of Semi-Automated Generation of 3D Models from 2D Drawings

To test the efficacy of the proposed systems and methods, the methods were experimentally validated for generating algorithms for automatically developing 3D bridge models from 2D PDF drawings. The experiments were particularly formed to examine the accuracy of the 3D models generated and the time and effort saved by automating the processes involved in generating the 3D models using the proposed framework.

A. Experimental Set-Up and Data

Figure 9:
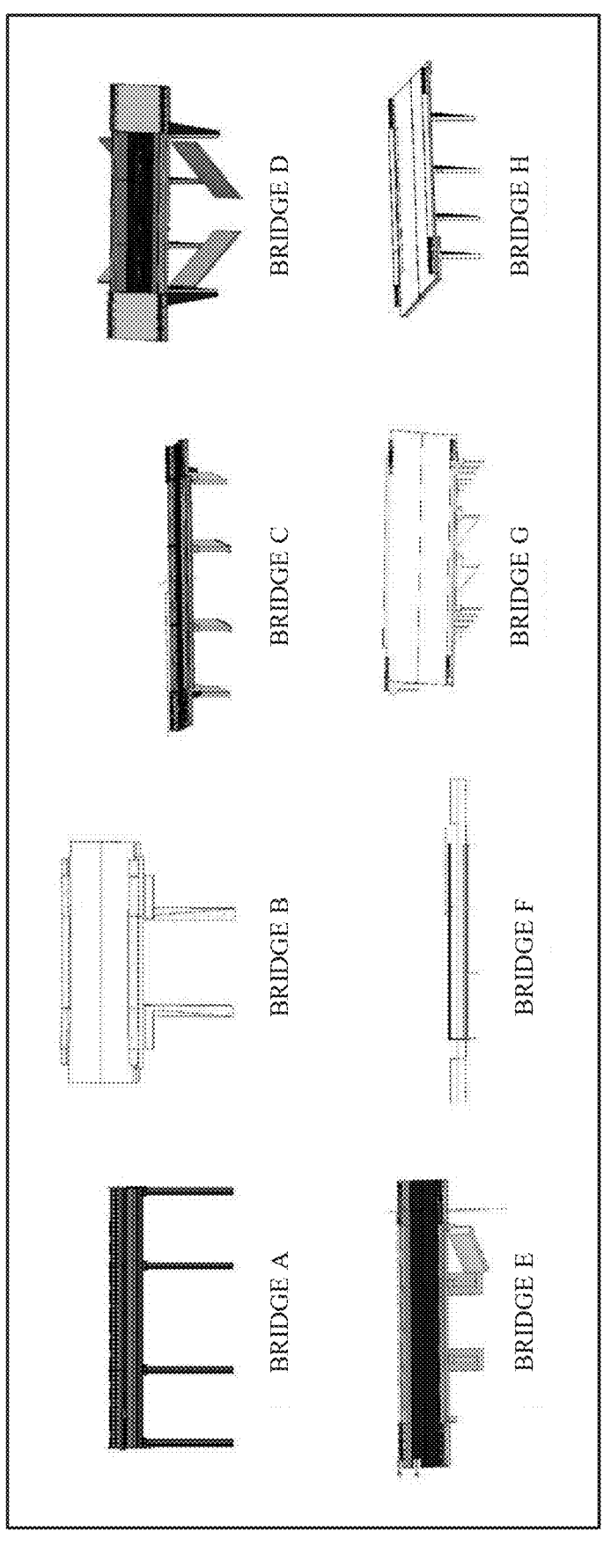
FIG. 9 depicts BIM renderings of eight bridge structures for experimentation.

The setup is composed of a laptop operating on Windows 10 pro® operating system; the processor was an Intel® Core™ i7-3720 QM CPU operating at 2.60 gigahertz, and the RAM was 16 gigabytes. Eight bridge structures, labeled bridges A-H in FIG. 9 were collected and used in the experiment. Bridges A and B were used to train and develop the 3D generation algorithms, while Bridges C-H were used in evaluating the accuracy and robustness of the developed algorithms. The bridge structures used in the evaluation were real bridges located in Indiana, USA. All bridge structures are continuous reinforced concrete slab bridges with over three spans, each span measured between 21 feet to 35 feet in length. Particularly, FIG. 9 illustrates renderings of the bridges as shown in Autodesk Revit® 2021 CAD and BIM software. The developed algorithms from the proposed methods were implemented in Python® programming language, version 3.9.0 and utilized to process the 2D bridge plans. The results were compared with those obtained using current state-of-the-art practices in the industry. In analyzing the accuracy of the developed algorithms, the distance measurement between two cloud points were used to detect the model change and volumetric differences between two developed models (i.e., one using the developed algorithms and the other using current industry-wide 3D bridge generation method). For each point cloud in the 3D model developed using prior art methods, CloudCompare open-source 3D point cloud and mesh processing software searches the nearest point in the model developed using the algorithms and computes their Euclidean distances. The mean distance, Gaussian mean, and standard deviation were evaluated using the opensource 3D point cloud and mesh processing software, CloudCompare V2. A partial result of the measurements of deviations (for Bridges C and D) are recorded in the table of FIG. 24 as each 3D model generated has multiple points. As an example, the comparison for Bridge C produced 649 classes (i.e., cloud to cloud comparisons) results. A class refers to a set of two compared cloud points (i.e., one cloud point in each model). The details of the experimental results, validation results and analysis are described in the following sub-sections.

B. Preparing a 3D Model Utilizing Prior Art Methods

The bridge plans for Bridges C-H were utilized to generate 3D models using prior art methods. Currently in the industry, professionals generate 3D bridge information models manually by utilizing several BIM platforms such as Autodesk Revit® and Bentley OpenBridge Modeler® software packages. The information used to generate the 3D models are typically extracted manually from 2D traditional bridge plans. In this experiment, the 3D models were developed by two industry experts (referred to hereafter as "designer 1" and "designer 2"). Each model developed contained the geometric representations of the bridge extracted manually by each designer. Each designer was asked to individually read the blueprints and architectural bridge plans and manually extract the information required to generate the 3D bridge models, and to use Autodesk Revit® CAD and BIM software to generate the 3D bridge models. Each designer used Autodesk Revit® CAD and BIM software to model the site, the bridge structure, the topography and recorded the time it took to complete each bridge model from start to finish.

C. Preparing a 3D Model Utilizing Methods Described Herein

The methods described above, generally laid out in the flowchart of FIG. 3, were used in developing algorithms that can process bridge PDF plans. These developed algorithms were then applied to process the plans for Bridges C through H and to generate their respective 3D models.

Figure 10:
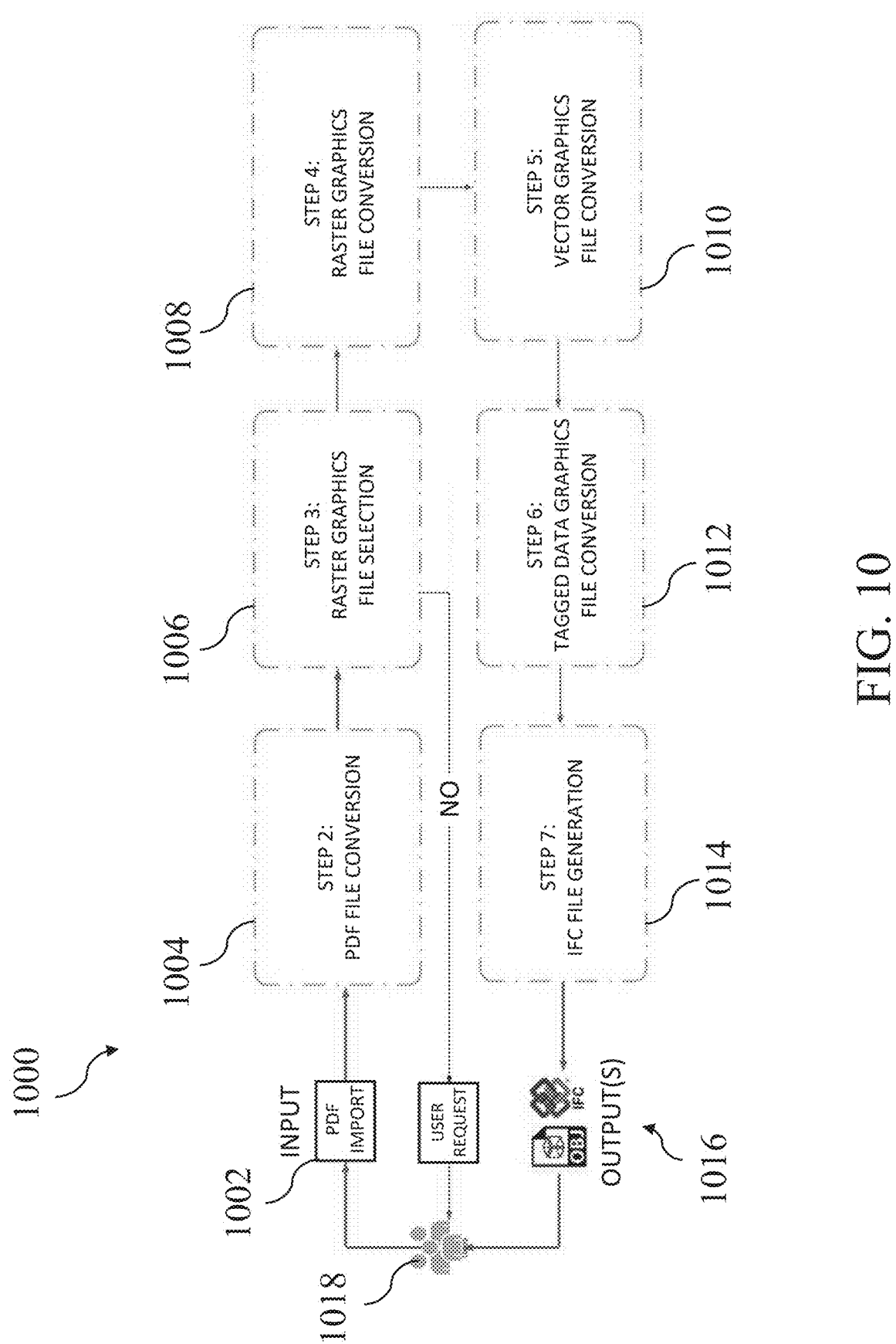
FIG. 10 depicts a flowchart of another exemplary method of semi-automated generation of 3D models from 2D drawings, showing eight steps involved in the method.

As shown in FIG. 10, generally following the structure of the methods described above, the algorithm (1000) generated consists of seven main steps: Step 1 (1002) to input the bridge file, such as by importing a PDF file; Step 2 (1004) to convert the PDF file; Step 3 (1006) to select the raster graphics file; Step 4 (1008) to convert the raster graphics file; Step 5 (1010) to convert the vector graphics file; Step 6 (1012) to convert the tagged data graphics file; Step 7 (1014) to generate one or more files according to industry standards, such as an IFC file, and Step 8 (1016) to output the one or more files generated at Step 7 (1014). In performing these method steps, several tools were utilized.

An Optical Character Recognition (OCR) software tool was utilized to analyze scanned PDF documents. A PNG raster graphics file tool was utilized for the converted PDF files, whereby a PNG raster graphics file was used because it provided a well-compressed raster file for the system. A scalable vector graphics (SVG) tool based in XML was used for the vector graphics file because the SVG was easily integrated with other specifications and standards. An OpenCV® library implemented in Python® programming language was used to convert the raster graphics sheet(s) to red-green-blue-alpha (RGBA) color models. An RGBA color model combines red, green, blue, and alpha lights to portray a broad array of colors. The RGBA color filter may be needed to generate labels and assign unique edges and vertices to the projections. A DXF tagged data graphics file format tool was used for the tagged data graphics file format. The DXF file format is a free, open-source format developed by Autodesk®, Inc. that is supported by most CAD programs. Two graphical software tools were used for extracting entry coordinates (e.g., Inkscape™ vector graphics editor and GNU Image Manipulation Program (GIMP™) raster graphics editor). "Geom tools" library implemented in Python® programming language was used. Finally, the Standards for Exchange of Product Model Data (STEP) standard was used in generating the IFC output file. The STEP exchange was used for addressing these exchanges issues between Computer Aided Design (CAD), Computer Aided Manufacturing (CAM), Computer Aided Engineering (CAE), Product Data Modeling (PDM) and other Computer Aided Technologies (Cax) systems (CAD Exchanger 2020).

Accordingly, the developed methods were implemented in Python® programming language and the experiment process was carried out according to the flowchart of FIG. 10. While various tools and software coding platforms were utilized for the experiments described herein, it should be understood that alternative tools and software coding platforms may instead be utilized to implement the methods described.

i. Step 1: PDF Import

The hard copy architectural drawings for Bridges C-H were imported into the developed 3D generation methods, such as by a user (1018). The process of importing the bridge plans into the system's directory was done manually, however, automatic importing using electronic files and data processors may be performed.

ii. Step 2: PDF File Conversion

Figure 11:
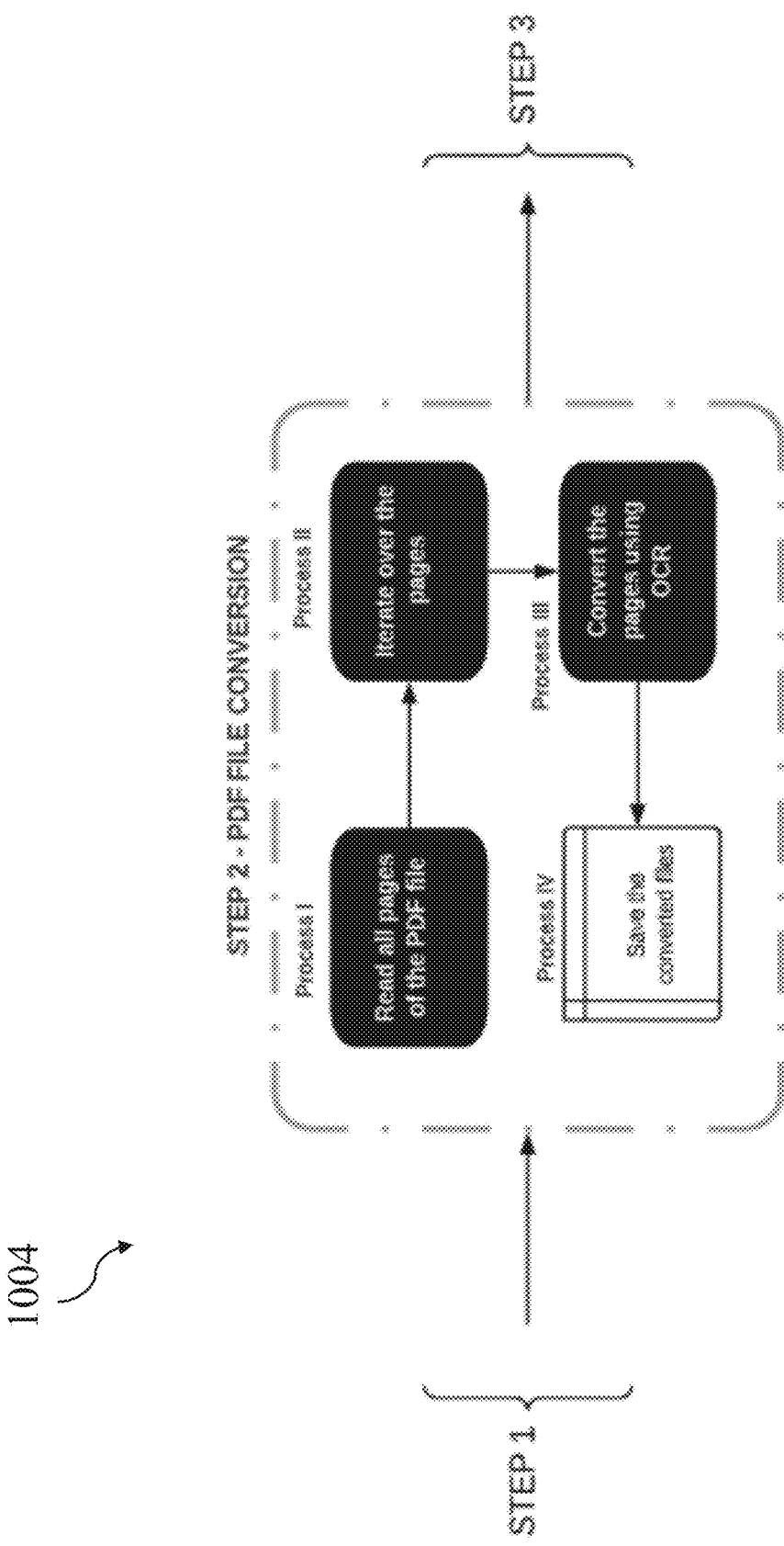
FIG. 11 depicts a flowchart of additional method steps which may be included within Step 2 of the flowchart of FIG. 10.

After the importation of the architectural bridge plans at step 1 (1002), each bridge plan was converted to a raster graphics file at step 2 (1004). Shown in FIG. 11 is one exemplary method for converting the imported PDF file to a raster graphics file. Particularly, process I loads all the sheets of the bridge plans in the PDF file, process II iterates over the loaded pages to parse the data using the OCR software, process III converts the pages to the raster graphics file format using the OCR software and one raster graphics file per sheet is generated, and process IV saves the converted file, that is, the multiple raster graphics file sheets generated.

iii. Step 3: Raster Graphics File Selection

Figure 12:
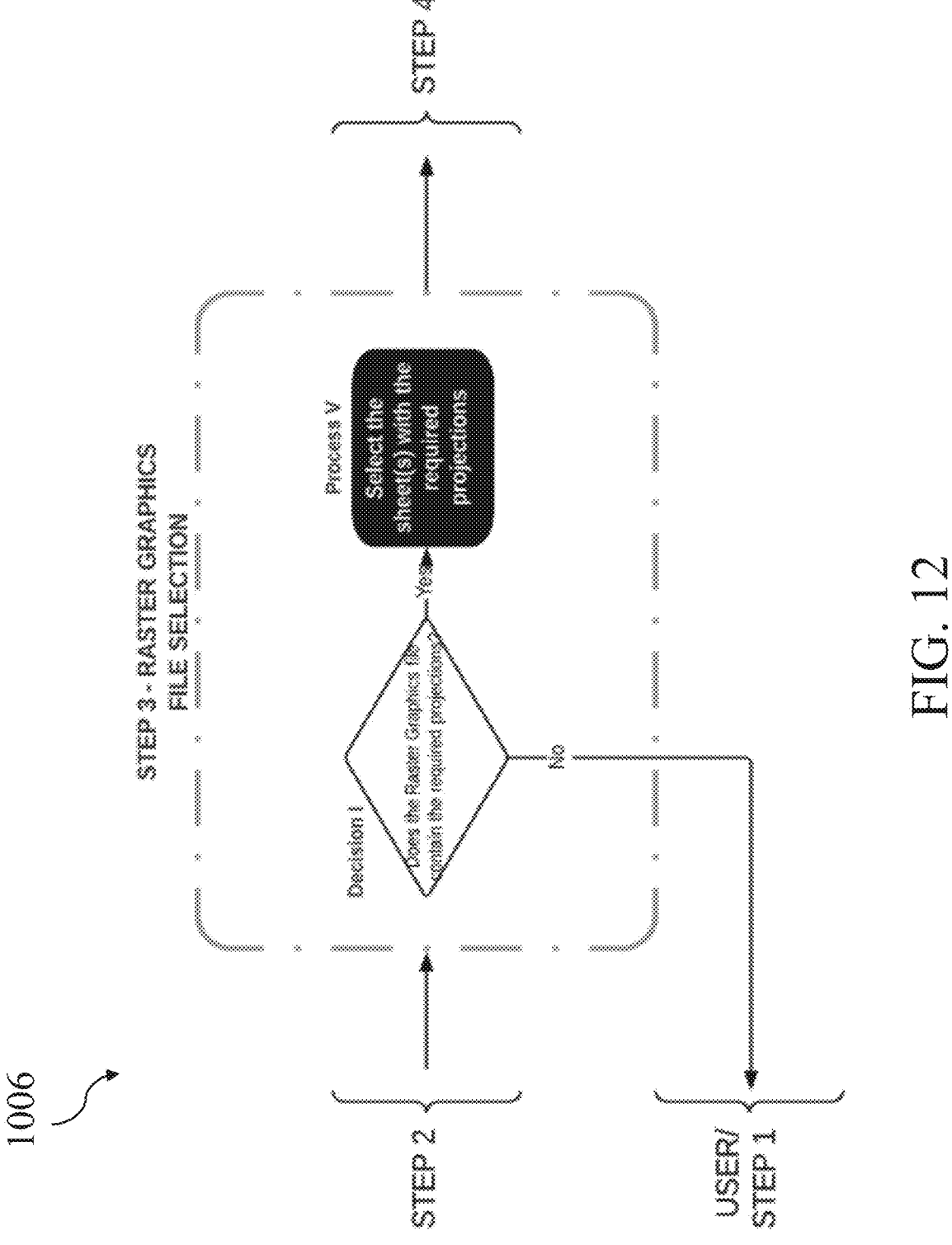
FIG. 12 depicts a flowchart of additional method steps which may be included within Step 3 of the flowchart of FIG. 10.

At step 3 (1006), once the raster graphics files for all sheets are generated and saved, the required sheet(s) for the 3D model generation are selected from the batch of raster graphic sheets generated. FIG. 12 shows one exemplary method for selecting the required raster graphics sheet(s) from the saved file. Decision I checks if the saved file contains the sheet(s) for the required projections; if so, the algorithm proceeds to Process V which then selects the sheet(s) with the required projections. If the file does not contain the required projections, the algorithm proceeds to prompt the user (1018) (see, FIG. 10) to re-import the PDF file with the required projections through Step 1 (1002) (see, FIG. 10).

iv. Step 4: Raster Graphics File Conversion

Figure 13:
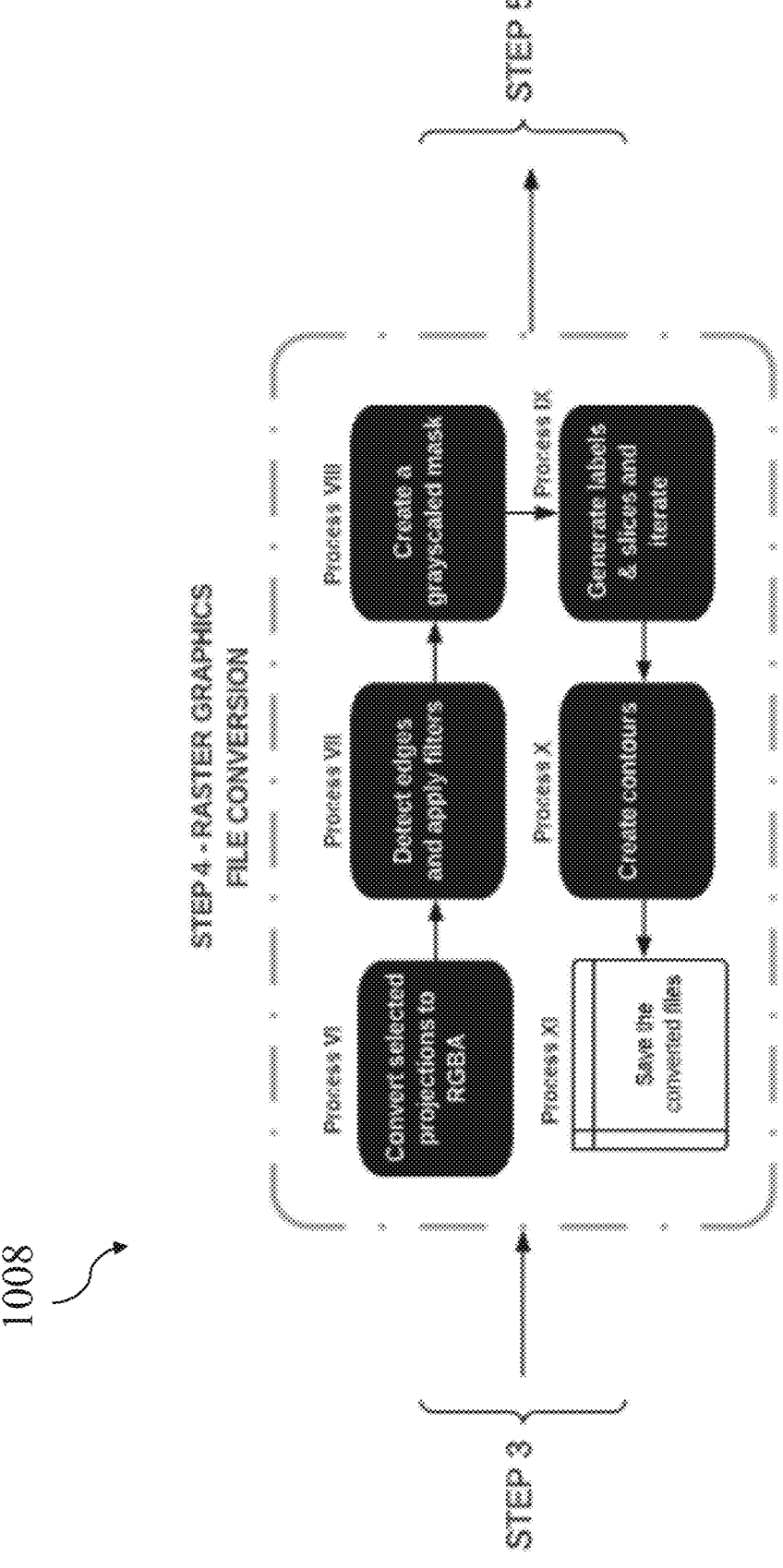
FIG. 13 depicts a flowchart of additional method steps which may be included within Step 4 of the flowchart of FIG. 10.

The selected raster graphics sheet(s) from Step 3 (1006) (see, FIG. 10) typically also contains other information that are irrelevant to the 3D information model generation process. Illustrating Step 4 (1008), FIG. 13 shows one exemplary method for converting the raster graphics file to a vector graphics file. Process VI utilizes the "opencv" library to convert the raster graphics sheet(s) to red-green-blue-alpha (RGBA) color model. Process VII applied filters to uniquely identify the features and characteristics of the projections. In Process VIII, a gray-scaled mask is created. This process is required to mask the unnecessary features in the sheet(s). Process IX generates labels and slices required to complete the object tracing sub-step. The tracing map is configured to ignore minor unimportant details in an event to prevent clogging of the final product with texts and minor details. In this experiment, the minimum threshold was set to 500, meaning objects that are less than "50*10" pixels would be ignored. A lower threshold would accommodate more details but may distort the model. Process X creates contours necessary to expunge the irrelevant texts and objects and exports to the vector graphics file format utilizing the vector graphics creation standard in python. Process XI saves the exported file.

v. Step 5: Vector Graphics File Conversion

Figure 14:
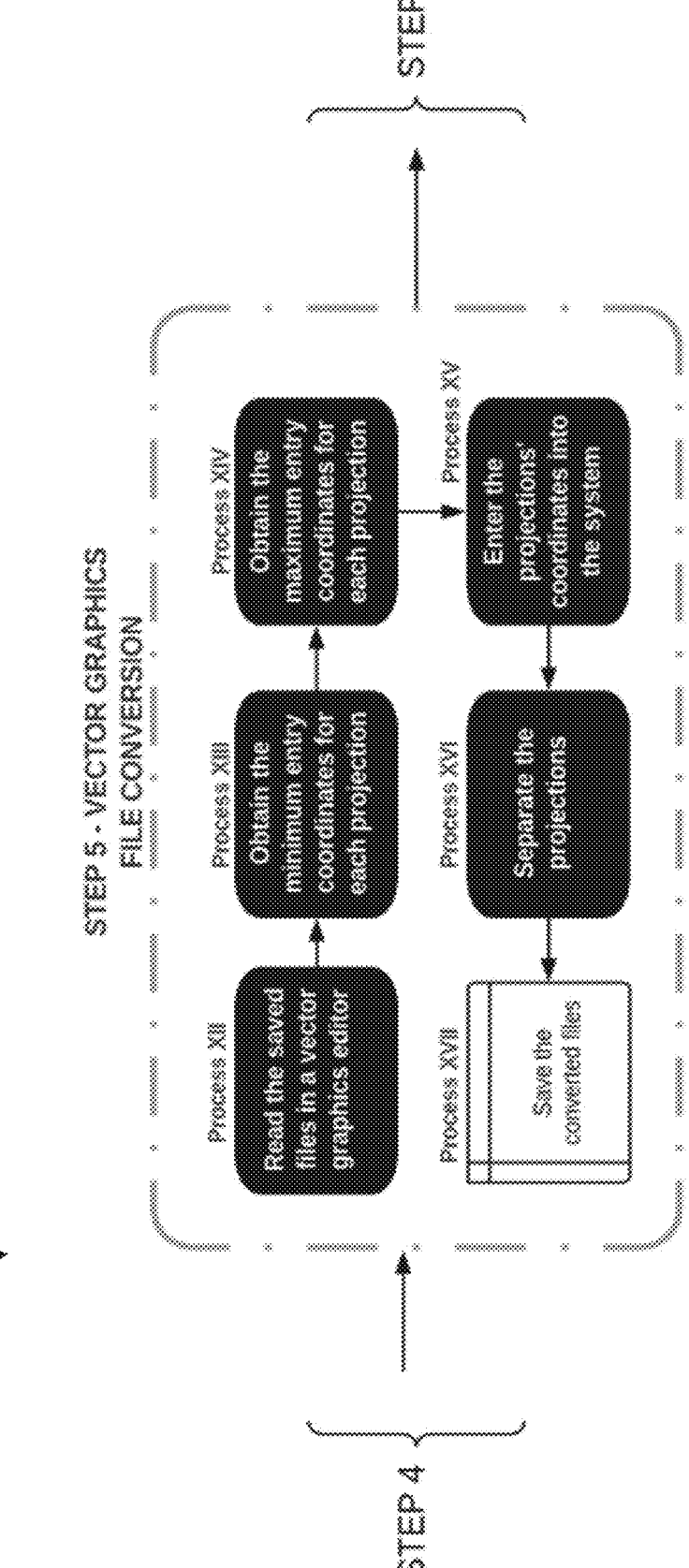
FIG. 14 depicts a flowchart of additional method steps which may be included within Step 5 of the flowchart of FIG. 10.
Figure 15:
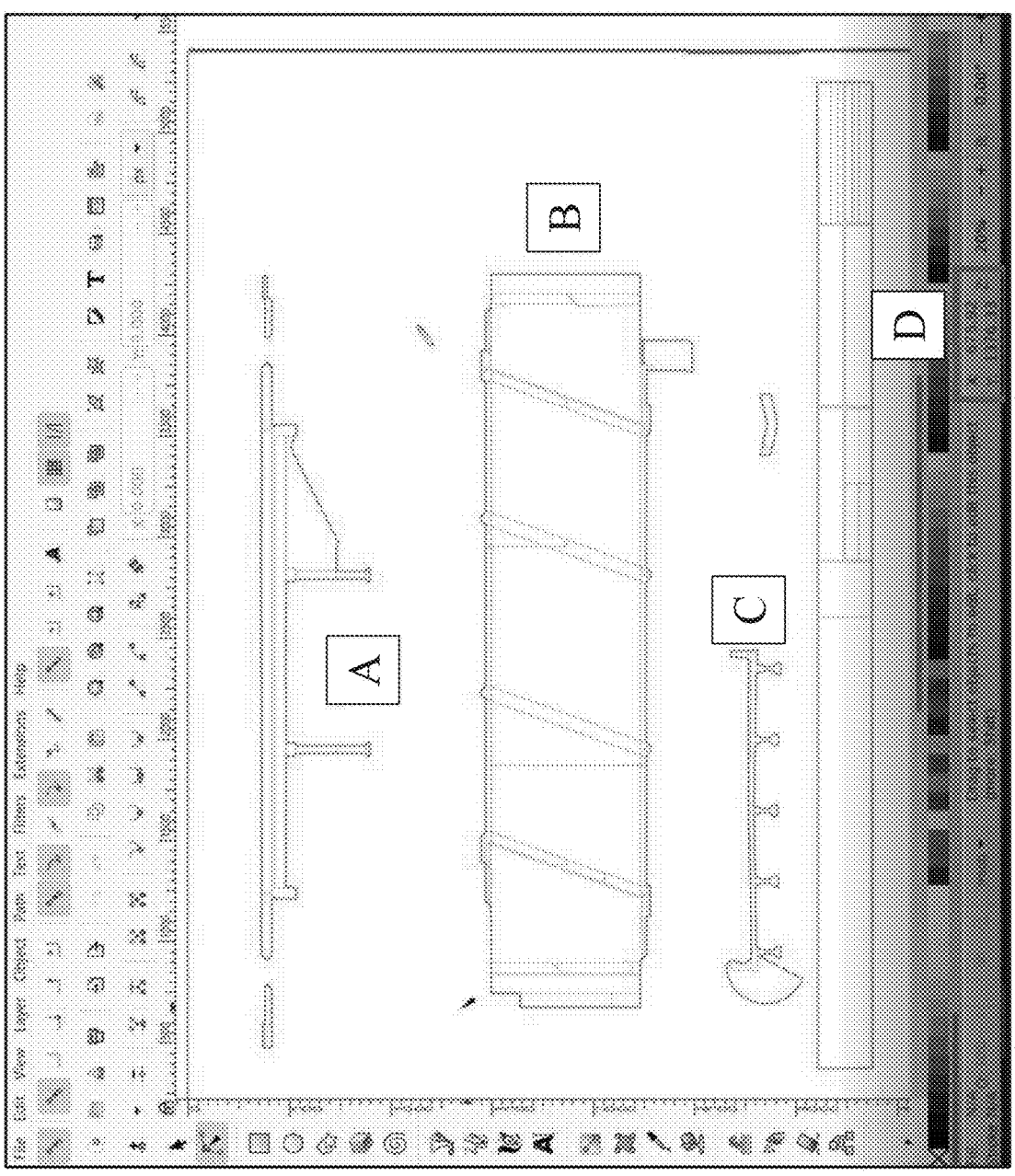
FIG. 15 depicts a collection of projection orthographic views in a scalable vector graphics file format of example results modeling a bridge structure following Step 4 of the method of FIG. 10.
Figure 16:
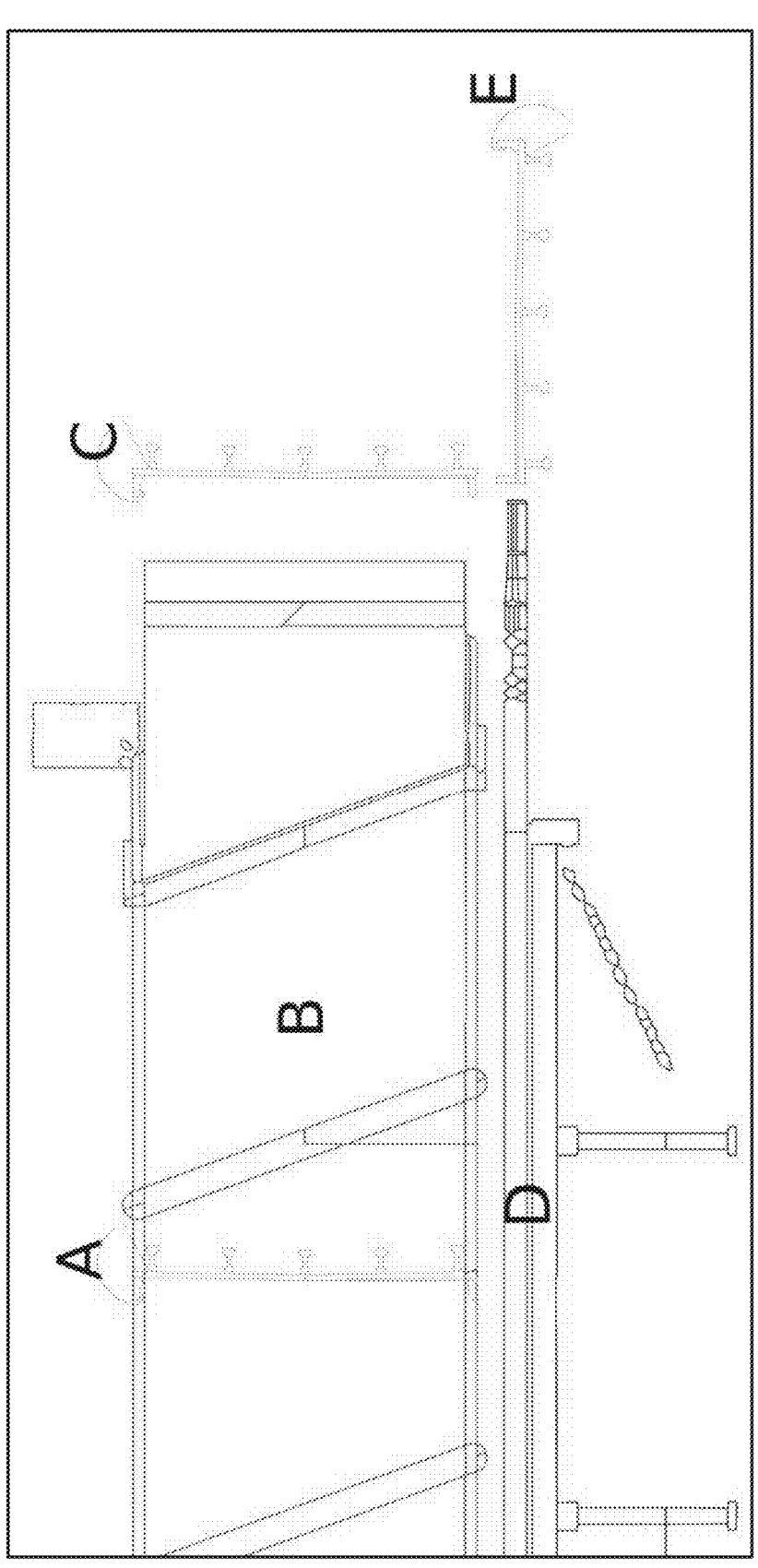
FIG. 16 depicts a collection of the projection orthographic views of FIG. 15 in a DXF file format following Step 5 of the method of FIG. 10.

Step 5 (1010) converts the vector graphics file generated in Step 4 (1008) (see, FIG. 10) to tagged data graphics file format. FIG. 14 shows one exemplary method for converting the vector graphics file to a tagged data graphics file. Process XII reads the saved vector graphics files in a vector graphics editor. The vector graphics editor software allows the retrieval of the boundary coordinates of each projection. Processes XIII, XIV and XV are the main operations needed for the conversions of each projection (FIG. 16). As shown in FIG. 15, letterings "A," "B," and "C" represent the front, top, and side projections, respectively, while lettering "D" represents the coordinate entry (X, Y) of the minimum boundary point of the projections. Process XIII retrieves the minimum entry coordinate for each projection while Process XIV retrieves the maximum entry coordinates for each projection. Process XV enters the retrieved maximum and minimum entry coordinates in the system. The algorithm then proceeds to Process XVI to separate the projections into different files and convert the separated files into DXF file format using the "dxfwrite" module in Python® programming language. This module allows for the exportation to DXF file format. Process XVII saves the exported file format. FIG. 16 shows one example of extracted bridge projections in a DXF file. A, C & E are the side projections; B is the top projection and D is the front projection.

vi. Step 6: Tagged Data Graphics File Conversion

Figure 17:
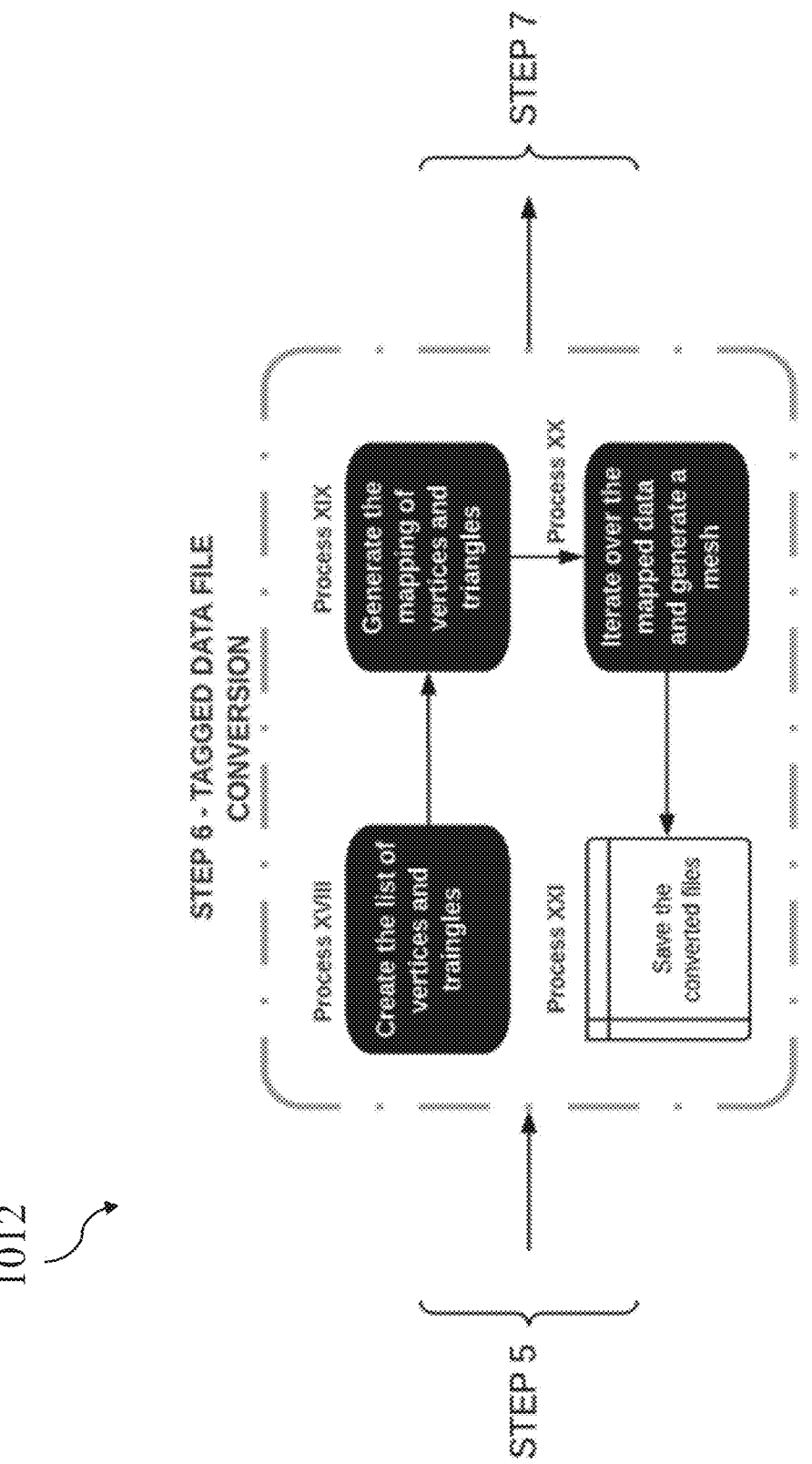
FIG. 17 depicts a flowchart of additional method steps which may be included within Step 6 of the flowchart of FIG. 10.
Figure 18:
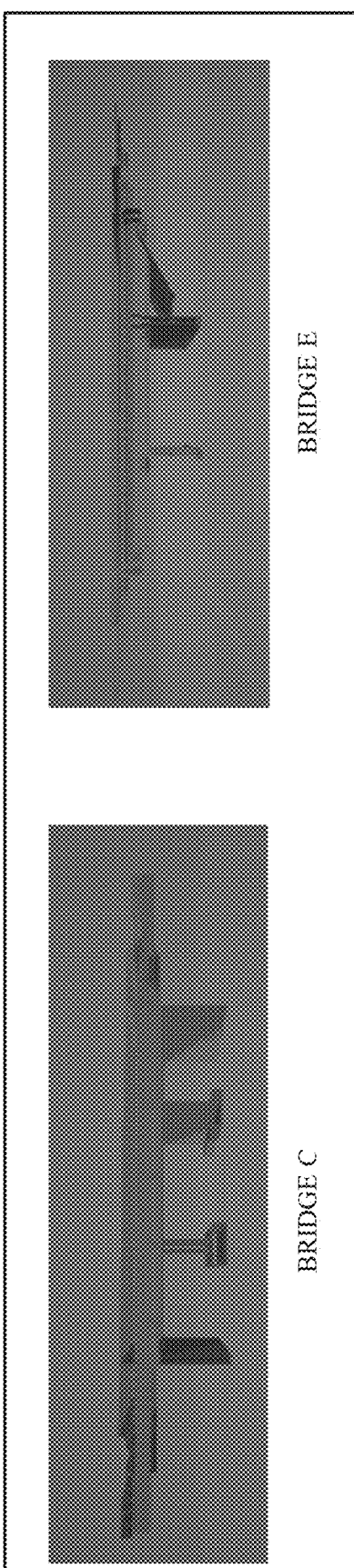
FIG. 18 depicts a collection of exemplary OBJ output images representative of modeled bridge structures following Step 6 of the method of FIG. 10.

With reference to Step 6 (1012) (see, FIG. 10), FIG. 17 shows one exemplary algorithm for converting the tagged data graphics file format and generating the OBJ file and bin file. Process XVIII creates a list of vertices and triangles. In creating the list of vertices and triangles, the projections must be aligned by rotating the projections along the intersection of the matching lines. Process XIX generates the mapping of the vertices and triangles by iterating over the list of vertices and triangles. Process XX iterates over the mapped data, removes clones, creates the contours, and generates the 3D mesh object. Process XXI saves the generated 3D mesh object. FIG. 18 shows an example of the 3D models generated for Bridges C and E.

vii. Step 7: IFC File Generation

Figure 19:
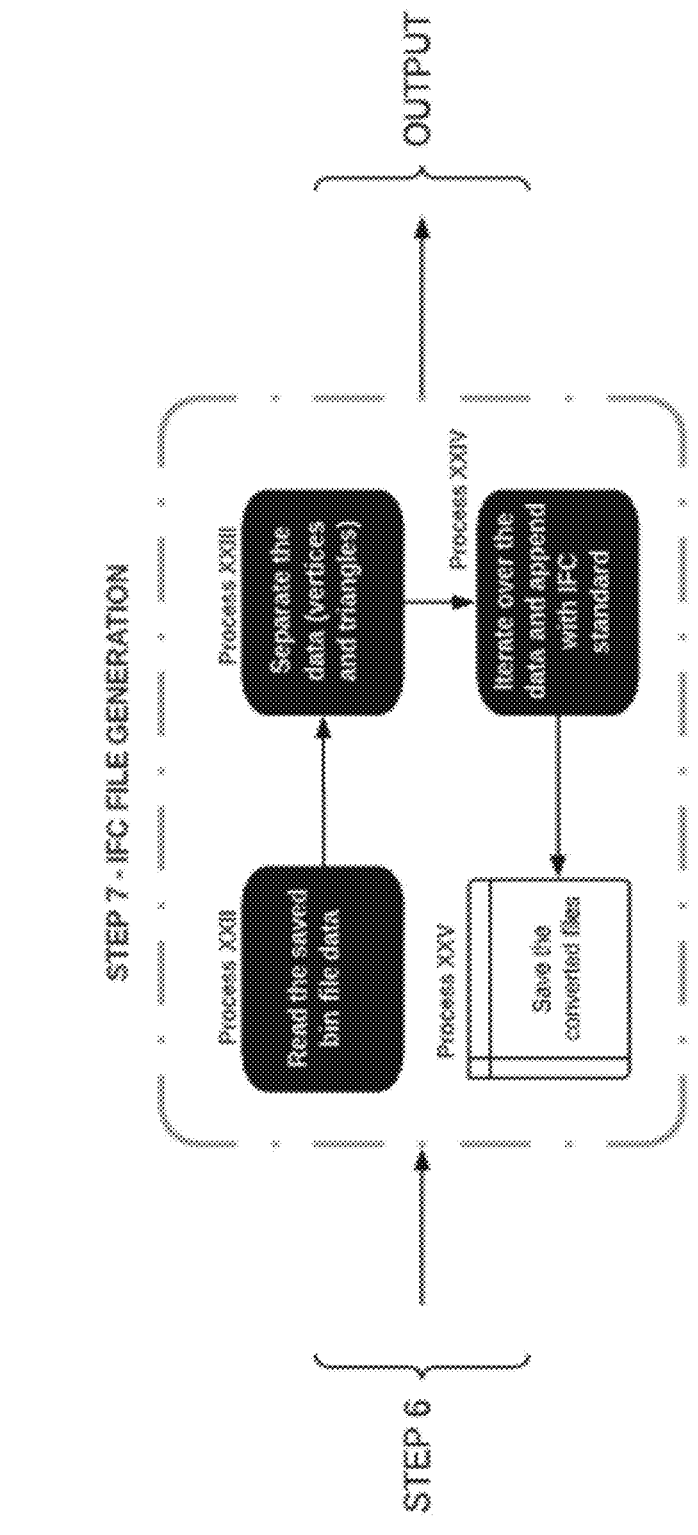
FIG. 19 depicts a flowchart of additional method steps which may be included within Step 7 of the flowchart of FIG. 10.
Figure 20:
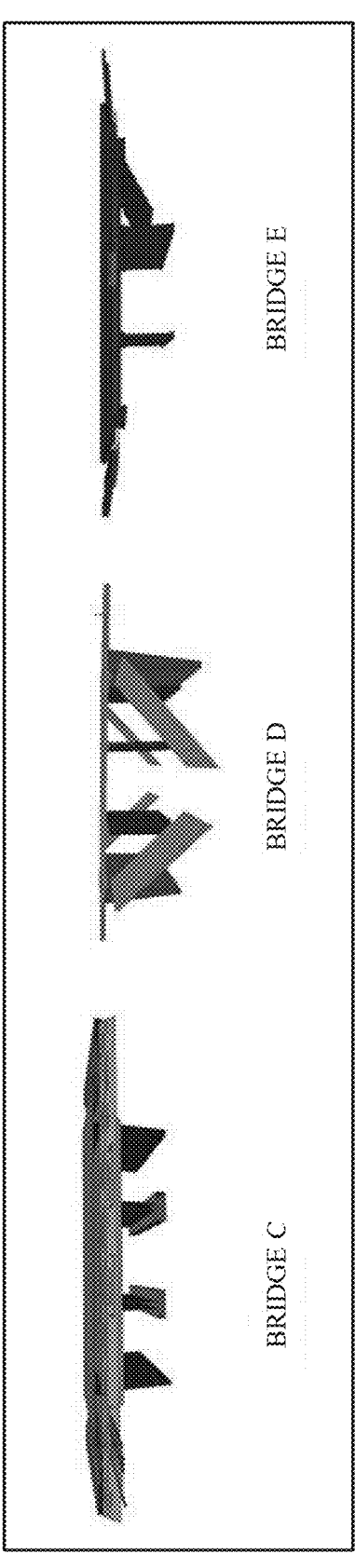
FIG. 20 a collection of exemplary IFC output images representative of bridge structures A, B, and C of FIG. 9 following Step 7 of the method of FIG. 10.

In Step 7 (1014) (see, FIG. 10), the encrypted bin file generated in Step 6 (1012) is utilized in generating the IFC output file. FIG. 19 shown one exemplary method for generating the IFC output file. Process XXII reads the encrypted bin file data for the projections. Process XXIII separates the data for the vertices and triangles. Process XXIV iterates over the separated data and appends the string values as specified in the ISO STEP standard. In developing the IFC output files, Python® programming language was implemented to read the bin data file and appended the values to the corresponding representation in the STEP ISO-10303-21 standard format. Process XXV saves the generated files. These output files can be imported into various IFC viewers. FIG. 20 shows an example of the IFC files for Bridges C, D and E opened using BIMvision® building information model viewer software.

viii. Discussion

Figure 22:
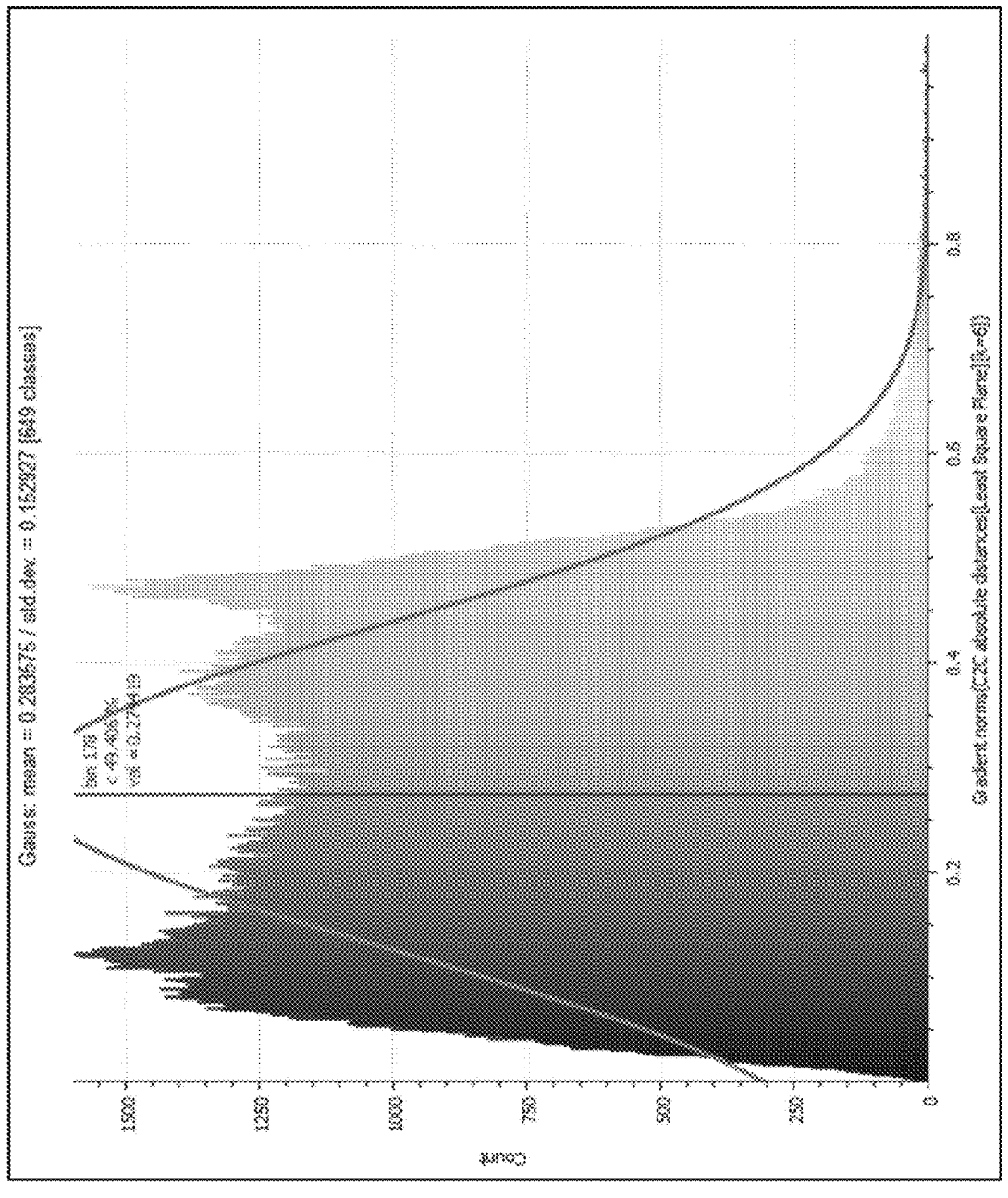
FIG. 22 depicts a graphical representation of a Gaussian distribution histogram output for bridge C of FIG. 9 following the performance of the method of FIG. 10.
Figure 23:
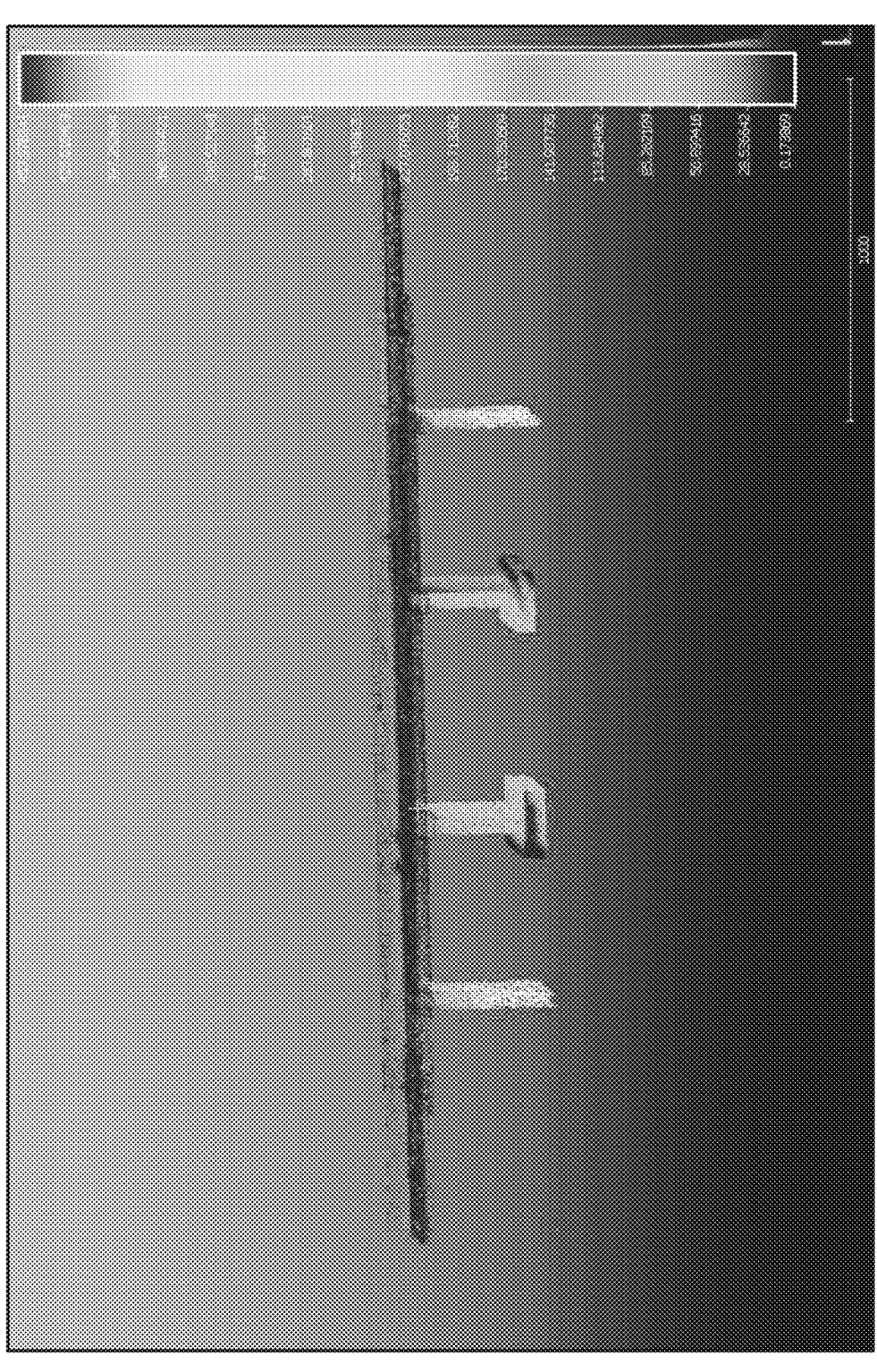
FIG. 23 depicts a graphical representation of cloud-to-cloud distance outputs for bridge C of FIG. 9 following the performance of the method of FIG. 10.

Three quantitative metrics were used to evaluate the results: (1) the mean distance between the point clouds of two compared models, (2) the standard deviation from the Gaussian mean between point clouds of the 3D superimposed surfaces, and (3) the time it took to generate the models using the developed algorithms comparing to a fully manual method in prior art. The results are summarized in the table of FIG. 21. FIG. 22 shows the Gaussian distribution histogram for Bridge C generated from CloudCompare 3D point cloud and mesh processing software. CloudCompare 3D point cloud and mesh processing software utilizes the Hausdorrf Distance theorem to compute the geometric difference between two 3D models. In comparing the two 3D models (i.e., the developed Bridge models using manual method in prior art and developed Bridge models using the methods described herein), the surface change is estimated as a distance between two homologous points. For each point in bridge models using the developed algorithms, a closest point is defined in bridge models using Autodesk Revit® CAD and BIM software. FIG. 23 shows the Cloud-to-Cloud comparison in CloudCompare 3D point cloud and mesh processing software. The table of FIG. 24 tabulates the partial results of the measurements of deviations in the distances recorded in Bridges C and D. For each bridge, there were multiple classes (cloud to cloud comparisons) generated; Bridge C produced 649 classes while Bridge D produced 546 classes as results. As shown in the Table in FIG. 21, the relatively low standard deviation indicates that the data points are close to the mean distances between both models; hence the developed algorithms generated models similar to the prior art pure manual practice. However, in comparing the time it took both methods to generate the 3D model, the developed algorithms took a user an average of 0.1785 hours (10 mins 43 secs) while the prior art manual practice took a user an average of 5 hrs. (300 mins). This shows that the developed algorithms using the proposed framework utilized 3.33% of the time it took using the prior art manual method to generate a 3D model.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

We claim:

1. A method of generating a three-dimensional (3D) structure model from a two-dimensional (2D) drawing file using a data processing device, comprising:
   (a) importing the 2D drawing file to the data processing device, wherein the 2D drawing file includes one or more illustrations of a structure;
   (b) converting the 2D drawing file into a raster graphics file;
   (c) converting the raster graphics file into a vector graphics file;
   (d) extracting one or more graphical projections representative of the structure from the vector graphics file;
   (e) converting the one or more projections into a tagged data graphics file, wherein the tagged data graphics file includes a plurality of cartesian points;
   (f) forming a 3D structure model representative of the structure by connecting the plurality of cartesian points; and
   (g) generating an electronic output file including the 3D structure model;
      wherein converting the 2D drawing file into the 3D model includes:
      (i) performing dilation to emphasize features of the structure and to join together detached parts of the structure within the 2D drawing file; and
      (ii) performing contouring to append continuous lines of the structure along identified boundaries.

2. The method of claim 1, further comprising converting the 3D structure model into an industry foundation classes (IFC) standard file, wherein the electronic output file includes the IFC standard file.

3. The method of claim 1, wherein converting the 2D drawing file into the raster graphics file includes utilizing a graphics library to read and interpret the 2D drawing file.

4. The method of claim 1, wherein converting the raster graphics file into the vector graphics file includes:
   (a) generating an RGBA color model based on the 2D drawing file by utilizing one or more libraries;
   (b) performing characteristics identification of features of the structure by applying one or more filters;
   (c) performing masking of irrelevant features of the structure by creating a grayscale mask of the 2D drawing model;
   (d) performing object tracing of the structure;
   (e) performing object removal to remove from the 2D drawing file any objects or shapes with values that do not meet a pre-defined threshold; and (f) performing text removal to remove from the 2D drawing file any text with values that do not meet or exceed a pre-defined threshold;
   wherein the pre-defined threshold mentioned in (e) and (f) is a minimum pixel value of an object, shape, or text.

5. The method of claim 1, wherein converting the one or more projections into the tagged graphics file includes performing coordinate retrieval for a subset of the structure.

6. The method of claim 1, further comprising:
   upon converting the raster graphics file into the vector graphics file, extracting a portion of the raster graphics file, wherein the portion of the raster graphics file includes a subset of a collection of sheets which forms the raster graphics file.

7. The method of claim 6, wherein the collection of sheets includes one or more of a title sheet, an index sheet, a cross-section sheet, a profile sheet, and a plan sheet pertaining to the structure, wherein the extracted portion of the raster graphics file includes the one or more illustrations of the structure.

8. The method of claim 6, wherein the extracted portion of the raster graphics file includes the one or more illustrations of a structure, the method further comprising:
   removing a subset of graphics from the extracted portion of the raster graphics file, wherein the subset of graphics includes at least one of text and borders situated adjacent to the one or more illustrations of the structure.

9. The method of claim 1, wherein generating an electronic output file including the 3D structure model includes outputting a file in an Industry Foundation Classes (IFC) standard format.

10. The method of claim 1, further comprising:
   generating a second electronic output file including the 3D structure model;
   wherein the electronic output file includes an OBJ file which contains the 3D structure model; and
   wherein the second electronic output file includes an encrypted BIN file that contains a set of project data created from generating the 3D structure model from the 2D drawing file.

11. The method of claim 1, wherein the raster graphics file includes one of a Joint Photographic Experts Group (JPEG), Graphics Interchange format (GIF), or a Portable Network Graphics (PNG) file.

12. The method of claim 1, wherein the 2D drawing file includes the one or more illustrations or projections of the structure, one or more plan views of the structure, one or more cross-section views of the structure, and one or more elevation views of the structure.

13. The method of claim 1, wherein converting the one or more projections into a tagged data graphics file includes:
   (a) inputting coordinate entries of the one or more projections, and
   (b) selecting and separating each of the one or more projections.

14. The method of claim 1, wherein forming a 3D structure model representative of the structure by connecting the plurality of cartesian points includes:
   (a) aligning each of the one or more graphical projections,
   (b) creating orthogonal lines from the one or more graphical projections to each respective opposite plane of each of the one or more graphical projections,
   (c) matching coordinates for each vertex of the one or more graphical projections,
   (d) removing clones for each vertex of the one or more graphical projections, and (e) defining intersection points for each edge of the one or more graphical projections.

15. The method of claim 14, wherein aligning each of the one or more graphical projections includes:

(a) shifting virtual faces of each of the one or more graphical projections, and (b) generating contours for each of the one or more graphical projections.

16. A method of generating a three-dimensional (3D) structure model from a two-dimensional (2D) drawing file using a data processing device, comprising:

(a) converting a raster graphics file into a vector graphics file, wherein the raster graphics file includes a 2D drawing of one or more illustrations or projections of a structure, one or more plan views of the structure, one or more cross-section views of the structure, and one or more elevation views of the structure;

(b) converting the 2D drawing file into a raster graphics file;

(c) extracting a portion of the raster graphics file, wherein the portion of the raster graphics file includes a subset of a collection of sheets which forms the raster graphics file;

(d) extracting one or more graphical projections representative of the structure from the vector graphics file;

(e) converting the one or more projections into a tagged data graphics file, wherein the tagged data graphics file includes a plurality of cartesian points;

(f) forming a 3D structure model representative of the structure by connecting the plurality of cartesian points; and (h) generating an electronic output file including the 3D structure model, wherein the electronic output file includes an OBJ file which contains the 3D structure model;

wherein converting the 2D drawing file into the 3D model includes:

(i) performing dilation to emphasize features of the structure and to join together detached parts of the structure within the 2D drawing file; and (ii) performing contouring to append continuous lines of the structure along identified boundaries.

17. The method of claim 16, further comprising:

(a) prior to converting a raster graphics file into a vector graphics file, importing a 2D drawing file to a data processing device, wherein the 2D drawing file includes the 2D drawing of the one or more illustrations of a structure; and (b) converting the 2D drawing file into the raster graphics file.

18. The method of claim 17, further comprising:

upon converting the 2D drawing file into the raster graphics file, extracting a portion of the raster graphics file, wherein the portion of the raster graphics file includes a subset of a collection of sheets which forms the raster graphics file.

19. A method of generating a three-dimensional (3D) structure model from a two-dimensional (2D) drawing file using a data processing device, comprising:

(a) importing the 2D drawing file to the data processing device, wherein the 2D drawing file includes one or more illustrations or projections of a bridge structure, one or more plan views of the bridge structure, one or more cross-section views of the bridge structure, and one or more elevation views of the bridge structure;

(b) converting the 2D drawing file into a raster graphics file;

(c) extracting a portion of the raster graphics file, wherein the portion of the raster graphics file includes a subset of a collection of sheets which forms the raster graphics file;

(d) converting the portion of the raster graphics file into a vector graphics file;

(e) extracting one or more graphical projections representative of the bridge structure from the vector graphics file;

(f) converting the one or more projections into a tagged data graphics file, wherein the tagged data graphics file includes a plurality of cartesian points;

(g) forming a 3D structure model representative of the bridge structure by connecting the plurality of cartesian points; and (i) generating an electronic output file including the 3D structure model;

wherein converting the 2D drawing file into the 3D model includes:

(i) performing dilation to emphasize features of the structure and to join together detached parts of the structure within the 2D drawing file; and (ii) performing contouring to append continuous lines of the structure along identified boundaries.

* * * * *